(12) United States Patent
Olsen et al.

(10) Patent No.: US 8,977,759 B2
(45) Date of Patent: *Mar. 10, 2015

(54) SYSTEM FOR MANAGING AUDIO/VIDEO STREAMS USING NON-AVB APPLICATION LAYER STRUCTURES IN LISTENER DEVICES OF AN AVB NETWORK

(71) Applicant: Harman International Industries, Incorporated, Stamford, CT (US)

(72) Inventors: David Olsen, Kaysville, UT (US); Levi Pearson, Lehi, UT (US); Craig Gunther, Salt Lake City, UT (US)

(73) Assignee: Harman International Industries, Incorporated, Northridge, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/987,652

(22) Filed: Aug. 19, 2013

(65) Prior Publication Data

US 2013/0339483 A1    Dec. 19, 2013

Related U.S. Application Data

(63) Continuation of application No. 13/174,100, filed on Jun. 30, 2011, now Pat. No. 8,516,130.

(51) Int. Cl.
*G06F 15/16* (2006.01)
*H04L 29/06* (2006.01)

(52) U.S. Cl.
CPC ........ *H04L 65/1069* (2013.01); *H04L 65/4069* (2013.01); *H04L 65/608* (2013.01)
USPC .......................................... 709/227; 709/230

(58) Field of Classification Search
CPC ..................... H04L 29/06326; H04L 65/1069; H04L 65/4069; H04L 65/608
USPC .......................................... 709/227, 228, 230
See application file for complete search history.

(56) References Cited

U.S. PATENT DOCUMENTS

| 5,764,915 | A | 6/1998 | Heimsoth et al. |
| 5,826,030 | A | 10/1998 | Hebert |
| 7,023,876 | B2 * | 4/2006 | Berry et al. .................. 370/465 |
| 7,079,519 | B2 | 7/2006 | Lee et al. |
| 7,099,950 | B2 | 8/2006 | Jones et al. |
| 7,328,291 | B2 | 2/2008 | Ament |

(Continued)

OTHER PUBLICATIONS

Strang, Dr. Thomas et al., "Vehicle Networks—Multimedia Protocols", Deutsches Zentrum fur Luft-und Raumfahrt, WS 2008/2009, 33 pages.

(Continued)

*Primary Examiner* — Lance L Barry
(74) *Attorney, Agent, or Firm* — Alleman Hall McCoy Russell & Tuttle LLP

(57) ABSTRACT

A system that includes a talker, a listener, and a controller may communicate over an Ethernet Audio/Video Bridging network. The controller may communicate control messages to manage data streams between the talker and the listener through one or more application layer interfaces of the talker and the listener. Based on the control messages, the talker and the listener may communicate using a Stream Reservation Protocol to reserve connection for, or remove connection from, the data streams. The talker and listener may communicate the success of reserving or removing the connections to the controller through the application layer interfaces.

20 Claims, 10 Drawing Sheets

(56) References Cited

U.S. PATENT DOCUMENTS

| | | | |
|---|---|---|---|
| 7,373,422 | B1 | 5/2008 | Paul et al. |
| 7,519,083 | B2 | 4/2009 | Stevenson et al. |
| 7,647,408 | B2 | 1/2010 | O'Neill |
| 7,698,492 | B2 | 4/2010 | Jeong et al. |
| 8,516,130 | B2 * | 8/2013 | Olsen et al. ............... 709/227 |
| 8,619,803 | B2 * | 12/2013 | Gunther et al. ............ 370/443 |
| 2006/0184715 | A1 | 8/2006 | Gikas et al. |
| 2008/0086568 | A1 | 4/2008 | Badt et al. |
| 2008/0232243 | A1 * | 9/2008 | Oren et al. ............... 370/216 |
| 2011/0231566 | A1 | 9/2011 | Gelter et al. |
| 2012/0036267 | A1 | 2/2012 | Finn |
| 2012/0099605 | A1 * | 4/2012 | Stanton ................... 370/463 |
| 2012/0236870 | A1 | 9/2012 | Klein |
| 2012/0284739 | A1 * | 11/2012 | Gunther et al. ............ 725/18 |
| 2012/0314597 | A1 * | 12/2012 | Singh et al. .............. 370/252 |
| 2012/0314713 | A1 * | 12/2012 | Singh et al. .............. 370/401 |
| 2013/0138800 | A1 * | 5/2013 | Gelter et al. ............. 709/224 |
| 2013/0166674 | A1 * | 6/2013 | Olsen et al. ............. 709/217 |
| 2013/0339483 | A1 * | 12/2013 | Olsen et al. ............. 709/217 |

OTHER PUBLICATIONS

Gunther, Craig, "802.1 Qat Current Status", IEEE 802.1 Working Group, Nov. 11, 2008, www.ieee802.org/1/files/public/docs2008/at-cgunther-gat-status-1108-v01.pdf, pp. 1-20.

"Virtual Bridged Local Area Networks—Amendment 12: Forwarding and Queuing Enhancements for Time-Sensitive", LAN/MAN Standards Committee, IEEE Computer Society, IEEE Std 802.1Qav, Jan. 5, 2010, pp. i-71.

"Virtual Bridged Local Area Networks—Amendment Xx: Stream Reservation Protocol (SRP)", LAN/MAN Standards Committee of the IEEE Computer Society, IEEE P802.1 Qat/D6.0, Apr. 23, 2010, pp. i-100.

"Virtual Bridged Local Area Networks—Amendment XX: Stream Reservation Protocol (SRP)", LAN/MAN Standards Committee of the IEEE Computer Society, IEEE P802.1 Qat/D6.1, Jun. 4, 2010, pp. i-100.

"Virtual Bridged Local Area Networks—Amendment 14: Stream Reservation Protocol (SRP)", LAN/MAN Standards Committee, IEEE Computer Society, IEEE Std. 802.1Qat, Sep. 30, 2010, pp. i-103.

"Draft Standard for Layer 2 Transport Protocol for Time Sensitive Applications in a Bridge Local Area Network", Microprocessor Standards Committee of the IEEE Computer Society, IEEE P1722/D2.5, Sep. 2010, pp. i-54.

"Timing and Synchronization for Time-Sensitive Applications in Bridged Local Area Networks", LAN/MAN Standards Committee, IEEE Computer Society, IEEE Std 802.1AS, Mar. 30, 2011, pp. i-274.

ISA European Patent Office, International Search Report and Written Opinion of PCT/US2012/043284, Sep. 5, 2012, Netherlands, 11 pages.

* cited by examiner

SYSTEM FOR MANAGING AUDIO/VIDEO STREAMS USING NON-AVB APPLICATION LAYER STRUCTURES IN LISTENER DEVICES OF AN AVB NETWORK

CROSS REFERENCE TO RELATED APPLICATION

This application is a continuation application of U.S. Non-Provisional application Ser. No. 13/174,100, filed Jun. 30, 2011 (now U.S. Pat. No. 8,516,130). The contents of U.S. Non-Provisional application Ser. No. 13/174,100 (now U.S. Pat. No. 8,516,130) are hereby incorporated by reference in their entirety.

BACKGROUND OF THE INVENTION

1. Technical Field

This invention relates to an Ethernet Audio-Video Bridging ("AVB") network, and more particularly to managing data streams on the AVB network through control messages sent through high-level application layer interfaces.

2. Related Art

Audio/video ("A/V") data may be transmitted in a network system from one endpoint to another endpoint. Before the A/V data is sent, control signals may be sent over the network in order to establish a path over which the A/V data may travel from the one endpoint to the other. Similarly, control signals may be used to remove the path between the endpoints.

SUMMARY

A system that includes a talker, a listener, and a controller may communicate over an Ethernet Audio/Video Bridging (AVB) network. The controller may be configured to manage the flow of one or more data streams between the talker and the listener. To manage the flow of the data streams, the controller may communicate control messages to the talker and/or the listener. In one example system, the control messages may be Function Block (FBlock) control messages used in accordance with a Media Oriented Systems Transport (MOST) standard. The control messages may be communicated through one or more application layer interface modules of the talker and/or the listener. Upon receipt of the control messages, the application layer interface module may be configured to use one or more functions described in or used in accordance with a Stream Reservation Protocol (SRP) to manage the flow of the data streams over the AVB network. To use the functions, the application layer interface module may communicate with one or more state machine modules and/or one or more SRP stack modules.

The controller may manage the flow of the data streams by providing one or more control messages to the talker and the listener to create the data streams and/or to remove connection from the data streams. When the talker receives a control message to create a data stream, the talker may communicate the message to the state machine module. The state machine module may be configured to register one or more attributes with the SRP protocol stack module, which may trigger one or more events at the listener to notify the listener of the data stream. The talker may be configured to send a status message to the controller through the application layer interface module, indicating whether the talker is able to create the data stream.

Upon receipt of the success message, the controller may be configured to send a connect message to the listener to connect to the data stream. The listener may receive the connect message through the application layer interface module of the listener. The application layer interface module may communicate the connect message to the state machine module. Upon receipt of the connect message and upon determining one or more events triggered by the talker, the state machine module may perform one or more functions to determine whether the listener is able connect to and/or establish connection to the data stream. The state machine module may also be configured to register one or more attributes with the SRP protocol stack module, which may trigger one or more events at the talker, notifying the talker of the listener's ability to connect to the data stream. The listener may also send a status message to the controller, through the application layer interface module of the listener, indicating whether the listener is able to connect to the data stream. Upon determining one or more listener events triggered by the listener's registration, the state machine module of the talker may perform functions to establish connection with the listener and send the data stream to the listener.

The controller may also be configured to send control messages to the talker and the listener to remove connection from the data stream. The controller may be configured to send a disconnect message to the listener through an application layer interface of the listener. Upon receipt of the disconnect message, the state machine module of the listener may be configured to perform one or more functions to disconnect from the data stream, including deregistering one or more listener attributes with the SRP stack module. The listener may be configured to send a status message to the controller, through the application layer interface, indicating whether the listener was able to remove connection from the data stream. Upon receipt of the status message from the listener, the controller may be configured to send a message to the talker through an application interface of the talker to remove the data stream. Upon receipt of the message, the state machine module of the talker may be configured to perform one or more functions to remove the data stream, including deregistering one or more talker attributes with the SRP stack module. The talker may be configured to send a state message to the controller, through the application layer interface, indicating whether the talker was able to remove the data stream.

Other systems, method, features and advantages will be, or will become, apparent to one with skill in the art upon examination of the following figures and detailed description. It is intended that all such additional systems, method, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Demand for connectivity between network devices continues to increase at a fast rate. In many systems, a greater number of devices are being manufactured which have network connection and/or communication capabilities. For example, in some automobiles, components not previously considered connective are being manufactured with connective capabilities. Parts, such as brakes, throttle, and/or various other parts, may be manufactured as Ethernet Audio-Video Bridging ("Ethernet AVB") enabled devices which may communicate through an Ethernet AVB network. In some systems, Ethernet AVB networks may be used to connect one or more devices, with audio and/or video data streams being sent wireless and/or through a wireline, such as an Ethernet cable.

In other systems, the devices may be connected and/or communicate with each other over a network using mediums other than Ethernet cables, such as a fiber optic cables. An example network that uses a medium other than an Ethernet cable is a Media Oriented Systems Transport (MOST) network. Devices connected in a MOST network may communicate with each other using the MOST vehicle bus standard, which uses time division multiplexing as an underlying transport mechanism to communicate A/V data between devices. In a system that communicates using the MOST vehicle standard, control of the A/V data sent over the network may be performed using Function Block ("FBlock") control signals. FBlock control signals may be sent and/or received by the devices in the MOST network at an application layer of the devices. At the application layer, the devices may have an interface for sending and receiving the FBlock control signals. The interface may be referred to as an FBlock interface. The FBlock interface may communicate with other applications and/or modules in the same or a different layer within the device to send, receive, and/or process the FBlock control signals.

The MOST network using fiber optic cables may be replaced with the Ethernet AVB network using Ethernet cables, where the underlying transport mechanism includes prioritized packet switching rather than time division multiplexing. Where the MOST network is replaced with the Ethernet AVB network, it may be desirable to still control the flow of A/V data using FBlock control signals.

Figure 1:
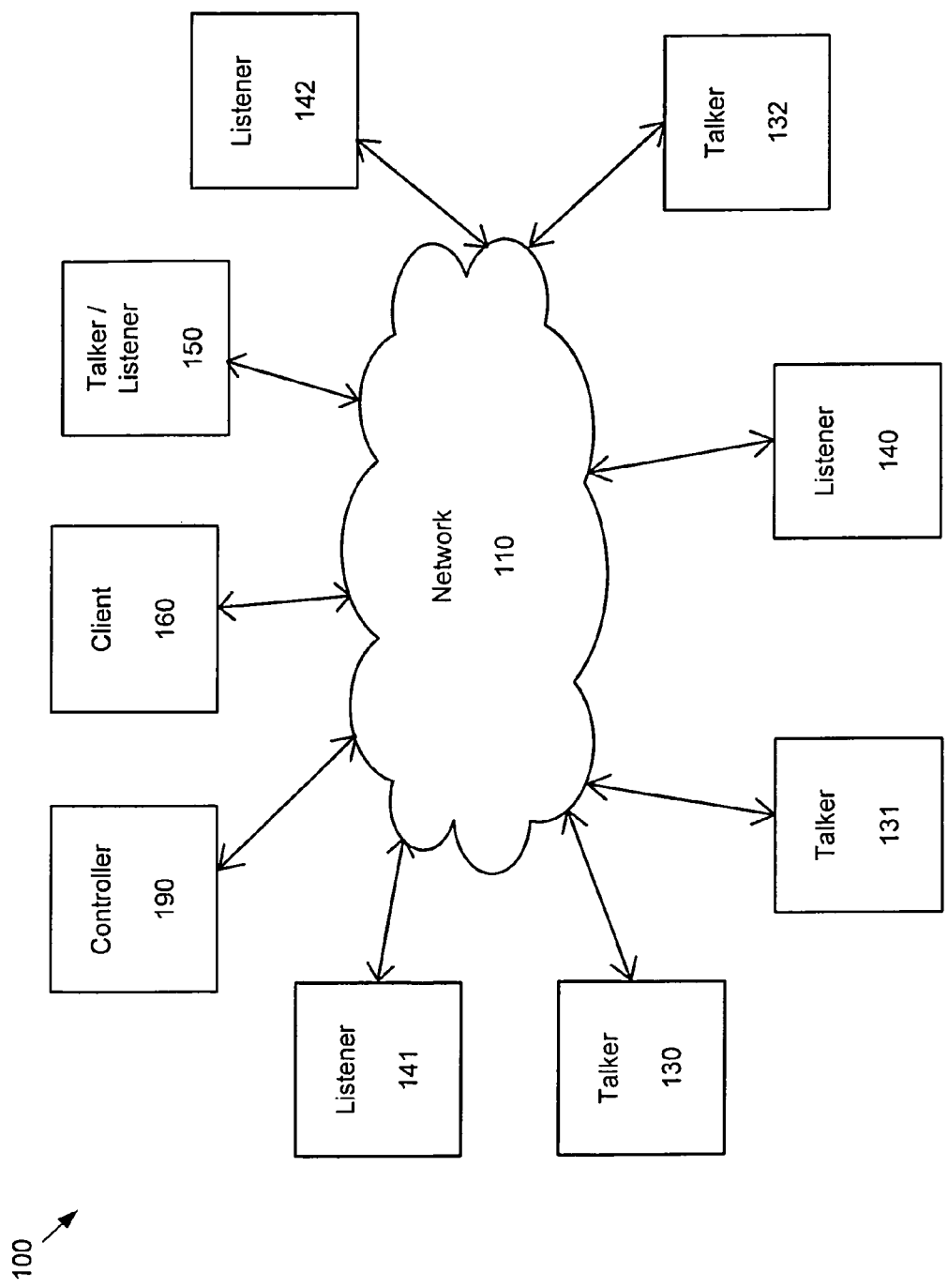
FIG. 1 is a block diagram of an example network communication system.

FIG. 1 illustrates an example network communication system 100 which may incorporate, include, and/or use high-level application layer control signals, such as FBlock control signals, to control the flow of A/V signals. The system 100 may include a plurality of electronic devices, including electronic devices 130, 131, 132, 140, 141, 142, 150, 160, and 190. More or fewer electronic devices may be included. Each electronic device 130, 131, 132, 140, 141, 142, 150, 160, and/or 190 may be configured to perform one or more roles. The roles may include the role of a talker, the role of a listener, the role of a talker/listener, the role of a client, and/or the role of a controller. Other roles may be included. The role of the talker may be to transmit information and/or data across the network 110. Alternatively or in addition, the role of the talker may be to establish, create, and/or reserve a connection for the transmission of a data stream carrying the information and/or data. Alternatively or in addition, the role of the talker may be to remove or tear down the connection. The role of the listener may be to receive the information and/or the data that has been sent over the network 110. Alternatively or in addition, the role of the listener may be to connect to and/or reserve connection to the data stream. Alternatively or in addition, the role of the listener may be to remove connection from the data stream. The role of the talker/listener may be to perform both the role of the talker and the listener, either at the same time or at different times.

The role of the controller may be to control the flow of the data stream between the talker and the listener or the talker/listener. The controller may control the flow of the data stream by sending one or more messages to the talker, the listener, and/or the talker/listener to create a connection and/or remove the connection of the data stream between the talker and the listener or the talker/listener. The messages may be communicated to the talker, the listener, and/or the talker/listener through a high-level application layer of the talker, the listener, and/or the talker/listener. Alternatively or in addition, the role of the controller may be to identify and/or determine which of the talkers are of importance, relevant to, and/or expected to be used by a listener. The role of the client may be to determine an input, such as a user input, indicative of the creation or the removal of the connection of the data stream and communicate the input to the controller.

The electronic devices 130, 131, 132, 140, 141, 142, 150, 160, and/or 190 may be configured to perform different roles in different situations or at different times. For example, in one situation, one of the electronic devices may be configured to be a talker. In a different situation, that electronic device may be configured to be a listener. Alternatively, the roles that the electronic devices 130, 131, 132, 140, 141, 142, 150, 160, and/or 190 may be configured to perform may be fixed. For the following description, the electronic devices 130, 131, 132, 140, 141, 142, 150, 160, and 190 in the system 100 have been designated the roles as previously described. In an alternative system, other roles may be designated. The system 100 may include one or more talkers 130, 131, and 132, one or more listeners 140, 141, and 142, one or more talker/listeners 150, one or more clients 160, and/or one or more controllers 190. Each component of the system 100, including the talkers 130, 131, 132, the listeners 140, 141, 142, the talker/listeners 150, the clients 160, and the controllers 190, may be in communication with one or more of the other components over the network 110.

One or more of the talkers 130, 131, and 132, the listeners 140, 141, and 142, the talker/listeners 150, the clients 160, and/or the controllers 190 may be or may include hardware, software, and/or a combination of hardware and software to implement part or all of the functionality of the system 100. One or more of the talkers 130, 131, and 132, the listeners 140, 141, and 142, the talker/listeners 150, the clients 160, and/or the controllers 190 may be or may include one or more processors, such as one or more central processing unit (CPU), and/or may be in communication with one or more processors, such as a processor of a field programmable gate array (FPGA). More or fewer components may be included in other examples.

One or more of the talkers 130, 131, and 132, the listeners 140, 141, and 142, the talkers/listeners 150, and/or the controllers 190 may be connected to each other through or using the network 110. Alternatively or additionally, one or more of the talkers 130, 131, and 132, the listeners 140, 141, and 142, the talkers/listeners 150, and/or the controllers 190 may be connected to each other directly. For example, one or more of the talkers 130, 131, and 132, the listeners 140, 141, and 142, the talkers/listeners 150, and/or the controllers 190 may be connected to each other using a wireline such as an Ethernet cable, and/or a wireless network. Various other connections are possible.

The network 110 may be, include, and/or communicate through or with an Ethernet AVB network. The network 110 may include one or more bridges which may communicate with one or more devices communicating through and/or connected with the network. The one or more bridges may communicate with the network 110 and/or devices connected to the network through or using various protocols, such as Ethernet AVB protocols designated by the IEEE. For example, one or more bridges may communicate with the network 110 and/or devices connected to the network through or using Ethernet AVB protocols such as IEEE 802.1AS-2001 (gPTP) for network timing and synchronization, IEEE 802.1Qav-2009 for queuing and forwarding streaming data, IEEE 802.1Qat-2010 (SRP) for reserving data stream bandwidth in a network, and/or IEEE 1722-2011 related to a possible data streaming format. Various other protocols may be used. Alternatively or additionally, the network 110 may be, include, and/or communicate through or with wide area networks (WAN), such as the Internet, local area networks (LAN), campus area networks, metropolitan area networks, or any other wireless and/or wireline networks that may allow for data communication. The network 110 may be divided into sub-networks. The sub-networks may allow access to all of the components connected to the network 110, or the sub-networks may restrict access between the components connected to the network 110. The network 110 may be regarded as a public or private network and may include, for example, a virtual private network, an encryption, or any other security mechanism employed over the public Internet, or the like. Various other types of networks 110 are possible.

One or more of the talkers 130, 131, and 132, the listeners 140, 141, and 142, and/or the talker/listener 150 may be connected to the network 110 in any configuration that supports data transfer. This may include a data connection to the network 110 that may be wired or wireless. One or more of the talkers 130, 131, and 132, the listeners 140, 141, and 142, and/or the talker/listeners 150 may be connected to an Ethernet AVB network and/or to each other through or with an Ethernet connection, such as using a cable or wireless connection to an Ethernet AVB network. Various other connections may be possible.

The system may include one or more talker systems, or talkers 130, 131, and 132. In small communication networks, the system may have only a small number of talkers, such as twenty or less. In other larger communication systems, the system may include hundreds, thousands, or potentially millions of talkers. Various numbers of talkers are possible.

The talkers 130, 131, and 132 may or may not be or include a portion or all of the features of a computer system, such as a computer system 1000 shown in FIG. 10 and described later. The talkers 130, 131, and 132 may be Ethernet AVB enabled and/or compatible. The talkers 130, 131, and 132 may be configured, adapted, operable, and/or enabled to communicate through and/or with an Ethernet AVB network using one or more standards or protocols. An example of a protocol associated with communications between a talker 130 and a network 110 may be the stream reservation protocol specified in IEEE 802.1Qat-2010. Alternatively or additionally, various other protocols, such as Multiple MAC Registration Protocol ("MMRP"), IEEE 802.1AS-2011 (gPTP), IEEE 802.1Qav-2009, and/or IEEE 1722-2011 may be used.

The talkers 130, 131, and 132 may be configured, adapted, operable, and/or enabled to send information and/or data through the network 110. For example, talkers 130, 131, and 132 may be configured and/or adapted to send a stream of information that includes data, commands, and/or command signals through, using, or across an Ethernet AVB network. Information and/or data sent by talkers 130, 131, and 132 through the network 110, such as through an Ethernet AVB network, may be received by other devices connected with the network 110, such as listeners 140, 141, and 142 and/or talker/listeners 150.

The talkers 130, 131, and 132 may perform various functions and/or be connected with or include various components. For example, a talker 130 may be connected with the network 110 and an input device, such as a musical instrument or microphone. Information and/or data may be sent to, received by, and/or otherwise input to the talker 130 or a device connected with the talker 130. For example, a user may play an instrument or sing into a microphone connected with the talker 130, and information and/or data about the instrument, singing, and/or voice may be received by the talker 130.

While the talkers 130, 131, and 132 in the network communication system may be, and may be described as, the physical devices themselves (such as a microphone), it should be appreciated that in some systems, the talker may be or may include a computer or other electronic controlling device, which may be used and/or operate to control the talker (such as a microphone), such as some or all of the features of a computer system 1000 shown in FIG. 10 and described later. In these systems, the computer or other electronic controller device may be AVB enabled and/or communicate directly with the network 110. In addition, the computer or other electronic controller device may communicate in various ways with the physical device and/or another device, such as with a wired or wireless connection. Various other alternatives are possible.

The talker 130 may process the information and/or data received in various ways. For example, the talker 130 may transform any signal received, such as the musical signal, from an analog signal to a digital signal. In other systems, a computing device may perform processing of received information and/or data, and may send the processed information and/or data to the talker 130. Various other processing functions may be performed by the talker 130 and/or devices in communication with the talker 130.

The talker 130 may transmit, send, output, and/or advertise processed information and/or data to the network 110, such as in, with, and/or using a data stream and/or Ethernet AVB signal. For example, the talker 130 may advertise a data stream encompassing data related to music played by a user on a device connected with the talker 130 onto an Ethernet AVB network. The information and/or data advertised by the talker 130 on the network 110 may be received by other devices, such as by various listeners 140, 141, and 142 and/or talker/listeners 150. Various other functions may be performed by the talker 130.

Each talker 130, 131, and 132 may have one or more talker attributes. Talker attributes may specify, include and/or otherwise identify characteristics about the talker 130 and/or a data stream advertised by a talker 130. For example, a talker attribute may indicate and/or advertise that the talker 130 may have a data stream, such as an audio, video, and/or command data stream, that the talker 130 will multicast over the network 110. A talker attribute may specify how much bandwidth a data stream advertised by a talker 130 may require in order to be transmitted through the network 110. The amount of bandwidth specified may be used by bridges and/or switches in the network 110 to determine if there is enough bandwidth capability to reserve the amount of bandwidth at each switch in the path between the talker 130 and the listener 140. In one example, the listener 140 may not be concerned with the amount of bandwidth because one or more of the switches and/or bridges may indicate a failure due to bandwidth constraints before the listener receives bandwidth information specified in the attribute. Alternatively or in addition, a talker attribute may specify how long it may take information and/or data sent from the talker 130 to reach a listener 140, which may be referred to as a latency or latency period. Alternatively or in addition, a talker attribute may specify a destination address. In one example, the destination address may not be unique to a particular listener, such as the listener 140. The destination address may be a multicast destination that allows any listeners, such as listeners 140, 141, 142 to receive and/or process the data stream being advertised once the reservation is in place and transmission has begun. Alternatively, the destination address may be unique to a particular listener.

Alternatively or in addition, a talker attribute may specify a unique stream identifier ("ID") for the stream advertised by the talker 130. A talker attribute may specify, include, and/or identify various other pieces of information and/or data. One talker attribute may include multiple pieces of information and/or data, such as information about a bandwidth required for download and/or a unique stream ID of the talker. In some systems, each talker attribute may be related to only one piece of information and/or data, and each talker 130, 131, and 132 may have multiple talker attributes. In other systems, each talker 130, 131, and 132 has only one talker attribute which specifies multiple pieces of information and/or data about the talkers. Various combinations are possible.

Talker attributes may include a Talker Advertise (TA) and/or a Talker Failed (TF). As mentioned, a talker attribute may specify a stream ID for a stream that the talker 130 produces or wants to produce. The stream ID may be a unique sequence of characters and/or numbers which may only be assigned to one stream. In some systems, no two streams may have the same stream ID. An assignment and/or identification of a unique stream ID of a talker 130 may then be used by devices, such as the listener 140, to identify a stream for which the device wants to attach itself. For example, the listener 140 may receive over an Ethernet AVB network a message, such as an advertisement, that includes a unique stream ID and may, based on an identification of the unique stream ID, request attachment to the stream associated with the unique stream ID. Various other uses of the stream ID are possible. The unique stream ID may be a 64 bit stream ID, or various other stream IDs may be used. The talker 130 may be configured to assign a unique stream ID to a stream at a time that the talker 130 is manufactured, such as by a manufacturer, after manufacture, such as at a time that the talker 130 connects with the network 110, such as by a controller 190, and/or at various other times.

One or more talker attributes may be stored in one or more of talkers 130, 131, and 132, listeners 140, 141, and 142, talker/listener 150, and/or controllers 190. For example, a unique stream ID of a talker 130 may be sent to and/or received by a controller 190, which may record and/or store the unique stream ID of the talker 130 and/or forward the unique stream ID of the talker 130 to one or more listeners 140, 141, and 142, such as through, with, or using a non-SRP protocol. Various other uses and functions of talker attributes are possible.

A stream advertisement may be a signal and/or other transmission from a talker 130, 131, 132 which may be passed through the network 110. A stream advertisement sent by a talker 130 may indicate that the talker 130 has a data stream that it can, cannot, will, or will not send, multicast, and/or otherwise transmit over the network 110. The stream advertisement may include a Talker Advertisement ("TA") or a Talker Failed ("TF"). The TA may be an advertisement for a stream that has not encountered any bandwidth or other network constraints along the network path from the talker. The TF may be an advertisement for a Stream that is not available to the Listener because of bandwidth constraints or other limitations somewhere along the path from the talker. If a bridge or switch along a path from the talker to listener does not have sufficient bandwidth or resources available, the bridge or switch may change the TA message to a TF message before forwarding it toward the Listener.

The stream advertisement may include details about the data stream, such as one or more talker attributes that may be sent with and/or included in a stream advertisement advertised and/or output by the talker 130. For example, the stream advertisement may include a unique stream ID of the data stream being advertised by the talker 130 using the stream advertisement. The stream advertisement sent by the talker 130 may be transmitted across the network 110 to and/or received by one or more devices (e.g., one or more listeners 140, 141, 142), in communication with the network. In some systems, the stream advertisement is sent to all devices on the network 110.

One or more listeners 140, 141, 142 and/or talker/listeners 150 may receive the stream advertisements. If one of the listeners wishes to receive the data stream being advertised by the TA, the listener may send a Listener Ready ("LR") signal to a bridge, the network 110, and/or talker 130, 131, 132. The signal may be a request to attach to the data stream via the stream ID included in the stream advertisement. When an Ethernet AVB bridge or switch in the AVB network 110 receives the LR signal from the listener, the bridge will match the LR with the TA and allow the data stream referenced by the stream advertisement to be sent to the requesting listener. One or more listeners 140, 141, 142 may request and/or attach to the same data stream via one stream ID. One of the listeners 140, 141, 142 may request and/or attach to more than one data stream via the stream IDs of each requested data stream. Other variations are possible.

One or more stream advertisements may be sent and/or accessed individually and/or alone with, through, and/or using the network 110. One or more stream advertisements may be sent to, accessed by, and/or received by one or more receiving devices on the network 110, such as listeners 140, 141, 142, talker/listeners 150, and/or controllers 190. Various other uses and functions of stream advertisements and/or talker attributes are possible.

In small networks, the system 100 may have only a small number of listeners, such as twenty or less. In other larger communication systems, the system 100 may have hundreds, thousands, or potentially millions of listeners. Various numbers of listeners are possible.

The listeners 140, 141, and 142 may or may not be or include a portion or all of the features of a computer system, such as a computer system 1000 shown in FIG. 10 and described later. The listeners 140, 141, and 142 may be Ethernet AVB enabled and/or compatible. The listeners 140, 141, and 142 may be configured, adapted, operable, and/or enabled to communicate through and/or with an Ethernet AVB network using one or more standards or protocols, such as the stream reservation protocol identified in IEEE 802.1AS-2011 (gPTP), IEEE 802.1Qav-2009, IEEE 802.1Qat-2010 (SRP), and/or IEEE 1722-2011. Alternatively, various other protocols, such as a MMRP, may be used.

Listeners 140, 141, and 142 may be configured, adapted, and/or operable to receive information that includes data across, through, and/or using the network 110. For example a listener 140 may be configured and/or adapted to receive a data stream passing across a network 110, such as an Ethernet AVB network. The information and/or data received by a listener 140, 141, and 142 may be, for example, the information and/or data sent by the talker 130, 131, and 132, information and/or data sent by a controller 190, and/or various other information and/or data sent through and/or using the network 110. In some systems, the listeners 140, 141, and 142 may register for and/or receive a data stream from one or more of the talkers 130, 131, and 132. Registration for and/or receipt of a data stream may or may be received by the listeners 140, 141, and 142 with a guaranteed bandwidth. Various other possibilities exist.

Listeners 140, 141, and 142 may perform various other functions and/or include or be connected with various other components. For example, a listener 140 may be connected with a network 110 and an output device, such as a speaker or television monitor. Information and/or data may be gathered and/or otherwise received by the listener 140 through the network 110. For example, information and/or data about notes played on a musical instrument may be transmitted through the network 110 by the talker 130, and may be received by the listener 140. The listener 140 may process the information and/or data received through the network 110. The listener 140 may output processed information and/or data to the speaker. For example, the listener 140 may output information and/or data related to the signal received through the Ethernet AVB network 110 to the speaker.

While the listeners 140, 141, and 142 in the network communication system may be, and may be described as, physical devices themselves (such as a speaker), it should be appreciated that in some systems, the listener may be or may include a computer or other electronic controlling device which may be used and/or operate to control the listener (such as a speaker), such as some or all of the features of a computer system 1000 shown in FIG. 10 and described later. In these systems, the computer or other electronic controller device may be AVB enabled and/or communicate directly with the network 110. In these systems, the computer or other electronic controller device may communicate with the physical device and/or a different device in various ways, such as with a standard wired or wireless connection. Various other alternatives are possible.

Each listener 140, 141, and 142 may have one or more listener attributes. A listener attribute may be, for example, a Listener Ready, a Listener Asking Failed, and/or a Listener Ready Failed attribute. These attributes may or may not contain a single piece of information, such as a stream ID that the listener may want to attach to.

One or more listener attributes may be sent with, through, and/or using the network 110. One or more listener attributes may be sent to, accessed by, and/or received by one or more receiving devices on the network 110, such as talkers 130, 131, and 132, talker/listeners 150, and/or controllers 190. One or more listener attributes may be stored in one or more of talkers 130, 131, and 132, listeners 140, 141, and 142, talker/listeners 150, and/or controllers 190. One or more listener attributes may be used to connect a listener with a data stream and/or talker. Various other uses and functions of listener attributes are possible.

The listener attributes may specify, include, and/or otherwise identify characteristics about the listener 140. Listener attributes may, for example, exist and/or be used outside of a stream reservation protocol stack within a talker or a listener, and/or may be used to inform devices on the network 110 about the attributes of the listener. For example, a listener attribute may specify what talkers a listener 140 may be interested in. A listener attribute may specify a unique listener ID for the listener 140, which may, for example, uniquely identify the listener 140 to other devices on the network 110. A listener attribute may identify one or more capabilities of the listener 140, such as bandwidth that the listener has available, a type of data stream that the listener 140 may be interested in and/or capable of processing, and/or various capabilities of the listener 140. A listener attribute may additionally or alternatively specify various other pieces of information and/or data about the listener 140. One listener attribute may include multiple pieces of information and/or data. In some systems, each listener attribute may be related to only one piece of information and/or data, and each listener 140, 141, and 142 may have multiple listener attributes. In other systems, each listener 140, 141, and 142 has only one listener characteristic which specifies multiple pieces of information and/or data about the listeners. Various combinations are possible.

Talker/listeners 150 may be configured, adapted, operable, and/or enabled to send and receive information and/or data through the network 110. A talker/listener 150 may include the capabilities and functions of a talker 130 and a listener 140. In some systems, all devices connected with the network 110 may be talker/listeners 150. In other systems, some or none of the devices connected with the network 110 may be talker/listeners 150. While the following discussion may only refer to talkers 130 and listeners 140 individually, it should be appreciated that in some systems, functions and attributes of talkers 130, 131, and 132 and/or listeners 140, 141, and 142 discussed may be accomplished by talker/listeners 150. Various combinations are possible.

The system may include one or more controllers 190. The controller 190 may or may not be or include a portion or all of the features of a computer system, such as a computer system 1000 shown in FIG. 10 and described later. The controller 190 may be Ethernet AVB enabled and/or compatible. The controller 190 may be configured, adapted, operable, and/or enabled to communicate with and/or through an Ethernet AVB network, such as according to, through, and/or with a one or more standards or protocols, such as the stream reservation protocol outlined in IEEE 802.1Q. Alternatively, various other protocols, such as a MMRP, may be used.

The controller 190 may be or comprise an application level interface that is configured to communicate directly or indirectly with the talkers 130, 131, 132, the listeners 140, 141, and 142, the talker/listener 150, and the client 160. The controller 190 may be configured to manage and/or control a connection of a data stream between two or more devices, such as between the talker 130 and the listener 140. The controller 190 may be configured to communicate with a client 160. The client 160 may be a device that desires to establish and/or tear down a data stream between two devices. For example, the client 160 may be a remote control. The remote control may be configured to issue a command, such as a "Play" command, to the controller 190 which instructs the controller 190 to establish a connection between a Digital Versatile Disc (DVD) player and a television and/or speakers in order to play a DVD. In FIG. 1, the controller 190 may communicate with the client directly, or through the network 110. Various other communications and interactions between the controller 190 and talkers 130, 131, and 132 and/or listeners 140, 141, and 142 are possible. In addition, in some examples, such as when the talkers 130, listeners 140, and listener/talkers 150 are self configured, the controller 190, and/or the client 160 may be omitted.

Figure 2:
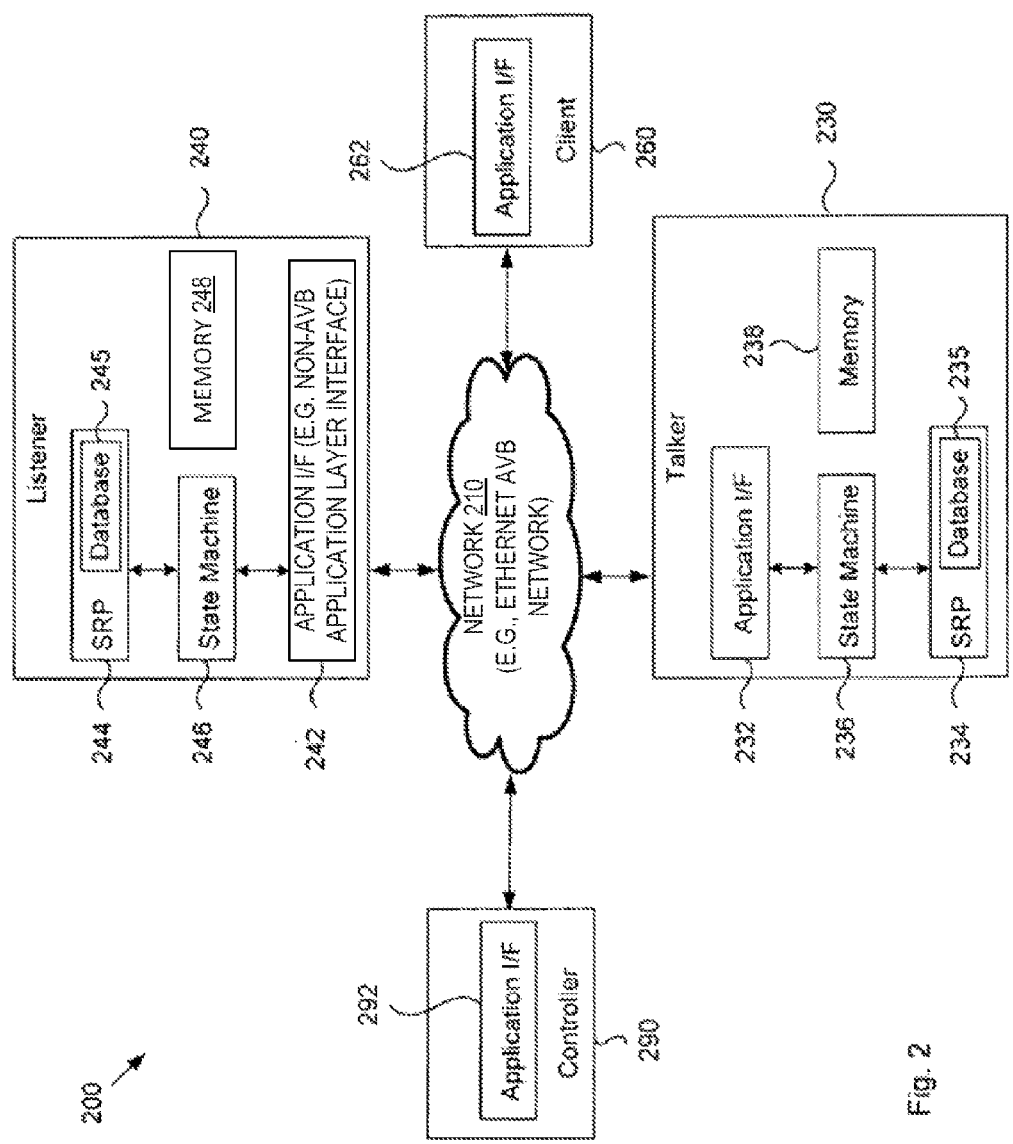
FIG. 2 is a block diagram of an example network communication system showing one or more components of a client, a controller, a talker and a listener.

FIG. 2 is a block diagram of a system 200 that includes a plurality of electronic devices, including electronic devices 230, 240, 260, and 290. The electronic devices 230, 240, 260, and/or 290 may be configured to perform one or more roles, such as the role of the talker, the role of the listener, the role of the talker/listener, the role of the client, and/or the role of the controller, as previously described. The electronic devices 230, 240, 260, and/or 290 may be configured to perform different roles at different times or in different situations. Alternatively, the roles of the electronic devices 230, 240, 260, and/or 290 may be fixed. Similar to the system 100, for the following description of the system 200, the electronic devices 230, 240, 260, and 290 are designated as a talker 230, a listener 240, a client 260, and a controller 290.

FIG. 2 illustrates components of the talker 230, the listener 240, the client 260, and the controller 290. Features and or operations of the system 200 and/or the components of the system 200 including the talker 230, the listener 240, the client 260, and/or the controller 290 may be found in one or more talkers 130, 131, 132, one or more listeners 140, 141, 142, one or more talker/listeners 150, one or more clients 160, and/or one or more controllers 190 of the system 100 shown in FIG. 1, and features of the system 100 may be found in the system 200.

The client 260 may be configured to send messages to and/or receive messages from the controller 290. For example, the client 260 may be configured to provide instructions to the controller 290 to control the creation and/or removal of a data stream, such as an AVB data stream, between the talker 230 and the listener 240. Other messages may include instructions to query functions of application layer interfaces; to administer a notification matrix of the application layer interfaces; to check whether entries of the client 260 and/or the controller 290 are present in the notification matrix; to describe the version of the application layer interface, divided into the major version, the minor version and the build number; and/or to generate an array of all existing AVB connections. The client 260 may provide the instructions by providing a message through an application layer interface 262 of the client 260. An example application layer interface is an FBlock interface. The controller 290 may include an application level interface 292 through which the controller 290 may receive the instructions from the client 260.

In response to receiving instructions to create a data stream between the talker 230 and the listener 240, the controller 290 may be configured to translate the instructions into appropriate commands to the talker 230 and/or the listener 240. For example, in response to receiving the instructions from the client, the controller 290 may be configured to send a message, referred to as an Allocate message, to the talker 230 to instruct the talker 230 to set up a data stream. The message from the controller 290 to the talker 230 may be communicated from the application layer interface 292 of the controller 290 to the application layer interface 232 of the talker 230. The Allocate message may include various parameters, including a SourceNr parameter indicating the source of the data stream. The talker 230 may have a list of available sources that may be streamed. By selecting a particular source from the list, the talker 230 may be configured to allocated the bandwidth for the selected source. As an example, the talker 230 may be configured to stream a stereo audio stream and a 5.1 surround encoded audio stream. The stereo audio stream may be designated as source 1 and the 5.1 surround encoded audio stream may be designated as source 2. If the talker 230 selects SourceNr 1, the talker 230 may allocate bandwidth for the stereo audio stream. If the talker 230 selects SourceNr 2, the talker 230 may allocate bandwidth for the 5.1 surround encoded audio stream. The parameters may also include one or destination addresses to which the data stream is to be sent, a presentation delay of the data stream, a rank of the data stream (e.g., a first indicator may indicate an emergency rank and a second indicator may indicate a non-emergency rank), a virtual local area network (VLAN) identifier used for the data stream, and/or a class of the data stream (e.g, a first indicator may indicate class A, and a second indicator may indicate class B).

In response to the receiving the Allocate message, the talker 230 may be configured to respond to the controller 290 that the talker 230 is able to source a data stream by providing a Success Message to the controller 290. The Success Message may include various parameters, including a SourceNr parameter which indicates the number of data source, and a Stream ID that uniquely identifies the stream that the talker 230 will source. The talker 230 may also be configured to respond to the controller 290 that the talker 230 is unable to create a data stream by providing a Failure Message to the controller 290. The Failure Message may include error information pertaining to the why the talker 230 is unable to create the data stream. The talker 230 may communicate the Success Message and/or the Failure Message by communicating the messages through the application layer interfaces 232, 292 of the talker 230 and controller 290, respectively.

In addition, in response to receiving the Allocate message, the talker 230 may be configured to register a talker advertise (TA) attribute in order to announce to the listener 240 that the talker 230 is supplying a data stream. In one example, the talker 230 may be configured to register the TA attribute in order to make the announcement in accordance with, through, and/or using the Stream Reservation Protocol ("SRP") as described in IEEE 801.1Qat-2010. In order to register the TA in response to receiving the Allocate message at the application layer interface 232, the application layer interface 232 may be in communication with a talker SRP stack 234. As shown in FIG. 2, the application layer interface 232 may be in communication with the talker SRP stack 234 via a talker state machine 236. The talker state machine 236 may comprise one or more algorithms that the talker 230 may use to transition between various states. The talker state machine 236 may communicate with the application layer interface 232 and/or the talker SRP stack 234 to receive one or more inputs or events and transition from one state to another state based on the received input or event and the current state of the talker 230 and/or talker state machine 236 determined by the state machine 236. In addition or alternatively, the talker state machine 236 may be configured to provide the SRP stack 236 with one or more messages, such as a Talker Advertise message and/or a Talker Failed message that may be propagated throughout the network 210 using the SRP stack 236. In some examples, one or more actions performed using the talker state machine 236 may trigger a SRP event at the listener 240. In one example, the action performed may comprise a database change.

When the application layer interface 232 of the talker 230 receives the Allocate message from the controller 290, the application layer interface 232 may communicate the Allocate message to the talker state machine 236. Upon receiving the Allocate message, the talker state machine 236 determines the current state and performs one or more actions corresponding to the received Allocate message and the current state. In one example, the current state may comprise an Initial State. In the Initial State, the talker state machine 236 has not received notification to create a data stream or waiting for notification of a registration from the listener 240 to create the data stream. When receiving the Allocate message in the Initial State, the talker state machine 236 may be configured to communicate with the talker SRP stack 234 and issue a query. When the talker state machine 236 issues a query, the talker state machine 236 may inform the talker SRP stack 234 of a stream IDs for a stream that the talker 230 is interested in creating. Without issuing a query, the talker 230 may not determine a Listener Ready event ("LR!") that is associated with the stream ID. After the query is issued, any LR registered in SRP by the listener 240 for that stream ID may be determined by the talker 230.

After receiving the Allocate message, the talker state machine 236 may also be configured to register a TA attribute. In one example, the talker 230 may register the TA attribute after the talker 230 issues a query. Registering the TA attribute may announce to the network 200 that the talker 230 is able to reserve the bandwidth and/or resources that are necessary to reserve the stream. When the talker 230 registers the TA attribute, the SRP stack 236 may notify the listener 240 of the registration and the stream for which it is being registered. For example, when the talker 230 registers the TA attribute, a TA event ("TA!") may be triggered at the listener 240. After the talker state machine 236 registers the TA attribute, the talker state machine 236 may transition from the Initial State to a Waiting State, where the talker state machine 236 may wait for an event triggered by a listener registration, such as a LR event. In addition, after the TA attribute registration, the talker 230 may be configured to send a Success message to the controller 290, indicating that the talker 230 is able to source a data stream. The talker 230 may be configured to send the Success message to the controller 290 when the talker state machine 236 transitions from the Initial State to the Waiting State. In addition, the talker 230 may send the Success message to the controller by sending the Success message through the application layer interface 232 of the talker 230. In one example, the Success message to the controller 290 includes the stream ID for the stream that the talker 230 has reserved.

In response to receiving the Success message from the talker 230, the controller 290 may be configured to send a message to the listener 240 that instructs the listener 240 to connect to the stream that the talker 230 is sourcing or has determined to source. The message from the controller 290 to the listener 240 may be referred to as a Connect message. In one example, the Connect message includes the stream ID provided by the talker 230 to the controller in the talker's 230 Success message. In one example, the controller 290 may communicate the Connect message to the listener 240 through the application layer interface 292 of the controller 290 to the application layer interface 242 of the controller.

In response to receiving the Connect message, the listener 240 may be configured to register a listener ready (LR) attribute in order to announce to the talker 230 that the listener 240 is able to connect to the data stream. In one example, the listener 240 may be configured to register the LR attribute in order to make the announcement in accordance with, through, and/or using the Stream Reservation Protocol ("SRP") as described in IEEE 801.1Qat-2010. In order to register the LR in response to receiving the Connect message at the application layer interface 242, the application layer interface 242 may be in communication with a listener SRP stack 244. As shown in FIG. 2, the application layer interface 242 may be in communication with the listener SRP stack 244 via a listener state machine 246. The listener state machine 246 may comprise one or more algorithms that the listener 240 may use to transition between various states. The listener state machine 246 may communicate with the application layer interface 242 and/or the listener SRP stack 244 to receive one or more inputs or events and transition from one state to another state based on the received input or event and the current state of the listener 240 and/or the listener state machine 246. In addition or alternatively, the listener state machine 246 may be configured to provide the SRP stack 246 with one or more messages, such as a LR message, a Listener Ready Failed ("LRF") message, and/or a Listener Asking Failed ("LAF") message that may be propagated throughout the network 210 using the SRP stack 246. In some examples, one or more actions performed using the listener state machine 246 may trigger a SRP event at the talker 230. In one example, the one or more actions performed may comprise a database change.

When the application layer interface 242 of the listener 240 receives the Connect message from the controller 290, the application layer interface 242 may communicate the Connect message to the listener state machine 246. Upon receiving the Connect message, the listener state machine 246 may determine the current state of the listener state machine and perform one or more actions corresponding to the received Connect message and the current state. In one example, the current state may comprise an Initial State. In the Initial State, the listener state machine 246 has not received notification to connect to a data stream or is not waiting for notification of a registration from the talker 230 for connecting to the data stream. When receiving the Connect message in the Initial State, the listener state machine 246 may be configured to communicate with the listener SRP stack 244 and issue a query. By issuing a query, the listener state machine 246 may inform the listener SRP stack 244 of the stream IDs in which the listener 240 is interested in receiving registration changes for. In one example, the listener state machine 246 may use the stream ID that was included in the Connect message when issuing the query. Without issuing the query, the listener 240 may not determine a TA event for the stream ID. After the query is issued, any TA registered in the listener SRP stack 244, the talker SRP stack 234, or any other SRP stack in the system 200 that may register a TA for that stream ID may be provided to the listener 240.

After the listener state machine 246 issues the query, the listener state machine 246 may transition from the Initial State to a Waiting State, where the listener state machine 246 may wait for an event triggered by a talker registration, such as a TA event ("TA!"). For example, when the talker 230 registers a TA, the registration may trigger a TA event at the listener state machine 246. In one example, the TA registration may not trigger the TA event at the listener 240 until the listener state machine 246 issues a query to the listener SRP stack 244. When the listener state machine 246 determines the TA message from the listener SRP stack 244, the listener state machine 246 may perform a series of actions. In one action, the listener state machine 246 processes information received in the TA message. Processing the TA message may include retrieving a destination address (DA) of the stream, which may be necessary for programming an Ethernet adapter of the listener 240 to receive frames addressed to that multicast address.

In another action, the listener state machine 246 may start an audio/video transport protocol (AVTP) engine of the listener. Without starting the AVTP engine, no media, or at least less than all of the media, may be recognized or processed by the listener 240, even though media may be streaming over the network 210 and delivered to the listener 240. For example, if the listener 240 registered a LR attribute, the registration may trigger a LR event at the talker state machine 236, causing the talker 230 to begin streaming the data stream. Without starting the AVTP protocol engine, the listener 240 may not recognize the stream. In addition, an Ethernet adapter may be programmed during the start of the AVTP protocol. To program the Ethernet adapter, the DA determined during the TA process action may be used. "Starting" the AVTP engine may include initiating a separate module, and/or may include enabling execution of an existing module.

In another action, the listener 240 may be configured to register the LR attribute. The listener 240 may register the LR attribute to announce to the network 210 and/or the talker 230 that the listener 240 may connect, is reserving, or has reserved connection to the data stream. Registering the LR attribute may trigger an LR event (LR!) at the talker 230, and in response the talker 230 may be configured to send the data stream over the network 210. As explained above, the listener 240 may be configured to register the LR event after starting the AVTP engine so that the listener 240 may recognize the media stream that the talker 230 determined to transmit due to receiving the LR event.

The listener 240 may be further configured to transition from the Waiting State to a Monitoring State. In one example, the listener 240 may be configured to transition from the Waiting State to the Monitoring State after registering the LR attribute. The Monitoring State may be considered a "normal operation" state of the listener 240 when a streaming media connection is established between the talker 230 and the listener 240. In the Monitoring State, the listener 240 may be monitoring for indications that the stream to which it is connected and/or for which has made the reservation for has terminated, either normally or abnormally. The state machine 246 may be monitoring the stream itself or messages received through the application layer interface 242, the listener SRP stack 244, and/or other components or modules of the listener 240 that may be configured to monitor and/or detect a stream's termination. As an example, in the Monitoring State, the listener state machine 246 may be monitoring for a Talker Failed event ("TF!"), which may be an indication of an abnormal termination of the stream's reservation. A TF event may be issued due to an emergency-priority stream taking up bandwidth that the stream had been using. As another example, in the Monitoring State, the listener state machine 246 may be monitoring the stream for a Talker Deregister event ("TalkerDeregister!"), which may indicate a normal termination of the reservation by the talker 230. As another example, the listener state machine 246 may be monitoring for a Disconnect event ("Disconnect!"), which may be a message or command from the controller 290 that the client 260 and/or the controller 290 no longer wants the listener 240 to listen to the stream.

After registering the LR attribute, and before, during, or after transitioning from the Waiting State to the Monitoring State, the listener 240 may be configured to send a Success message to the controller 290, which may indicate that the listener 240 has successfully connected to and or reserved reservation for the data stream. The listener 240 may be configured to issue the Success message through the application layer interface 242 of the listener 240 to the application layer interface 292 of the controller 290. In response to receiving the Success message from the listener 240, the controller 290 may be configured to provide a response to the client 260 that indicates to the client that the talker 230 and the listener 240 were able to establish a connection for streaming the data stream.

In one example, the listener 240 may also be configured to issue a Failure message to the controller 290, indicating the listener 240 is unable to connect to and/or reserve reservation for the data stream, and/or that the listener's connection to and/or reservation for the data stream was terminated. The listener 240 may be configured to send the Failure message to the controller 290 through the application layer interface 242 of the listener 240 to the application layer interface 292 of the controller 290. The Failure message may include information related to one or more errors associated with why the listener 240 was unable to connect, reserve reservation for, or continue to be connected to and/or reserve reservation for the data stream. In response to receiving the Failure message from the listener 240, the controller 290 may be configured to provide a response to the client 260 that indicates to the client that the talker 230 and the listener 240 were unable to establish a connection for streaming the data stream.

The listener 240 may be configured to send the Failure message when the listener state machine 246 is configured in the Waiting State and/or the Monitoring State. In addition or alternatively, the listener 240 may be configured to send the Failure message in response to a Talker Failed event. In one example, as mentioned above, a Talker Failed event may be triggered by an abnormal termination of the stream's reservation, such as by an emergency-priority stream taking up bandwidth that the stream had been using. If the listener state machine 246 is configured in the Waiting State, when the Talker Failed message is received, the listener state machine 246 may be configured to register a Listener Asking Failed ("LAF") attribute, indicating that the listener 240 is unable to connect or no longer able to reserve connection to the stream. The listener state machine 246 may further be configured to log one or more errors indicating why the listener 240 is unable to connect or is no longer able to reserve connection to the stream. The listener state machine 246 may further be configured to remain in the Waiting State. After registering the LAF attribute and/or logging the one or more errors, the listener 240 may be configured to send the Failure Message to the controller 290.

Alternatively, if the listener state machine 246 is in the Monitoring State, then in response to receiving the Talker Failed message, the talker state machine 246 may be configured to initially stop the AVTP engine in order to disconnect from the data stream. After stopping the AVTP engine, the listener state machine 246 may then be configured to register the LAF attribute and log one or more errors associated with receiving the TF event and/or registering the LAF attribute. The listener state machine 246 may also be configured to transition from the Monitoring State to the Waiting State. After registering the LAF attribute and/or logging the one or more errors, and before, during, or after transitioning from the Monitoring State to the Waiting State, the listener 240 may be configured to send the Failure Message to the controller 290.

After registering the LR attribute by the listener state machine 246, a LR event ("LR!") may be triggered. For example, a LR signal associated with the LR event may be propagated through the listener SRP stack 244 of the listener 240 and/or the talker SRP stack 234 of the talker 230 and received by the talker state machine 236. When the talker state machine 236 receives the LR event, the talker state machine 236 may be in the Waiting State. Upon receipt of the LR event, and in the Waiting State, the talker state machine 236 may be configured to start the AVTP engine of the talker 230. When the talker state machine starts the AVTP engine, the talker 240 may begin streaming the data stream over the network 210, and connection of the data stream may be established between the talker 230 and the listener 240. Because the listener 240 has already started its own AVTP engine, the listener 240 may recognize the media stream that it is being received from the talker 230.

The talker 230 may be configured to begin streaming a data stream and establish connection with the listener 240 upon receipt of an LR event when the talker state machine 236 is configured in a state other than the Waiting State. For example, the talker 230 may be configured to establish connection with the listener 240 upon receipt of an LR event when the talker state machine 236 is configured in a Failed State. In the Failed State, the talker 230 is not streaming a data stream to the talker 240 because the talker 230 has received notification, such as by receiving a LAF event, that the listener 240 is not able to reserve connection to the data stream. Upon receipt of the LR event, the listener 240 indicates to the talker 230 that the listener 240 is able to connect to the data stream. Upon receipt of the LR message, the talker state machine 236 starts the AVTP engine to establish connection with the listener 240 and transitions to a Ready State, where the talker 230 may operate under notice that the listener 240 is able to connect to the stream.

In the example above, the talker state machine 236 is initially configured in the Failed State. The talker state machine 236 may be configured in the Failed State because the talker 230 received notice that the listener 240 is not able to accept the stream. When the listener 240 determines it may not accept the stream, the listener 240 may register a LAF attribute, which may trigger a LAF event at the talker 230. When talker state machine 236 receives the LAF event, the talker state machine 236 may be configured in the Ready State. Upon receipt of the LAF event, the talker state machine 236 may be configured to stop the AVTP engine to stop streaming the data stream. The talker state machine 236 may also be configured to log one or more errors associated with the LAF event. In addition, the talker state machine 236 may be configured to transition from the Ready State to the Failed State.

In some systems, such as the system 100 shown in FIG. 1, there may be more than one listener, such as listeners 140, 141, 142 of system 100. Where the system includes more than one listener, the Ready State may indicate that all of the listeners are able to accept the data stream. Similarly, where the system includes more than one listener, the Failed State may indicate that none of the listeners are able to accept the stream. Where the system includes more than one listener, there may be a third state that indicates at least one listener is able to accept the stream and also at least one listener is unable to accept the stream. For example, in system 100, if listeners 140 and 141 each register a LR attribute indicating that the listeners 140, 141 can accept the stream, and if listener 142 registers a LAF attribute indicating that the listener 142 is unable to accept the stream, then the talker state machine 236 may be configured to be in the third state. The third state may be referred to as a Ready/Failed State. A registration of at least one LR attribute and a registration of at least one LAF attribute may trigger a Listener Ready/Failed event ("LRF!").

The talker state machine 236 may be configured to transition to the Ready/Failed State. When the talker state machine 236 transitions to the Ready/Failed State, the talker state machine 236 may be configured to start the data streaming and/or maintain the data streaming because at least one listener is able to accept the stream. Also, in the Ready/Failed State, the talker state machine 236 may be configured to log one or more errors because at least one listener is unable to accept the stream. For example, if the talker state machine 236 is in the Waiting State and receives a Ready/Failed event, the talker state machine 236 may be configured to start the AVTP engine, log an error, and then transition from the Waiting State to the Ready/Failed State. Similarly, if the talker state machine 236 is configured in the Ready State and receives a LRF event, the state machine 236 may be configured to log an error and transition from the Ready State to the Ready/Failed State. Likewise, if the talker state machine 236 is configured in the Failed State and receives a LRF event, the talker state machine 236 may be configured to start the AVTP engine, log an error, and transition from the Failed State to the Ready/Failed State.

The talker state machine 236 may also be configured to transition from the Ready/Failed State. For example, when the talker state machine 236 receives a LR event, the talker state machine 236 may be configured to transition from the Ready/Failed State to the Ready State. As another example, when the talker state machine 236 receives a LAF event, the talker state machine 236 may be configured to stop the AVTP engine, long any errors associated with the LAF event, and transition from the Ready/Failed State to the Failed State.

The talker state machine 236 and/or the listener state machine 246 also may be configured to transition to their respective Waiting States in response to receiving a deregister event. The talker state machine 236 may receive a Listener Deregister event (ListenerDeregister!). The Listener Deregister event may be triggered in response to the listener state machine 246 deregistering one or more attributes, such as deregistering a LR attribute. The listener state machine 246 may deregister an attribute in response to a normal or natural termination of a connection to a data stream. An example of a normal or natural termination may be a user-initiated termination in order to change streams. Another example may be a system-initiated termination in order for the device to enter a low-power sleep state. Similarly, the listener state machine 246 may receive a Talker Deregister event (TalkerDeregister!). The Talker Deregister event may be triggered in response to the talker state machine 236 deregistering one or more attributes, such as deregistering a TA attribute. The talker state machine 236 may deregister an attribute in response to a normal or natural termination of supplying the data stream. An example of normal termination of supplying the data stream may be a user-initiated termination due to a media change, such as removal of a Compact Disc audio source for the stream.

The listener state machine 246 may be configured to receive a Talker Deregister event when the listener state machine 246 is configured in the Monitoring State. When the listener state machine 246 receives a Talker Deregister event, the listener state machine may be configured to stop the AVTP engine of the listener 240. The listener state machine 246 may also be configured to deregister a listener attribute, such as a LR attribute. Deregistering the listener attribute may trigger the Listener Register event at the talker state machine 236, which may cause the talker state machine 236 to stop the AVTP engine of the talker 230 and/or transition to the Waiting State. After the listener state machine 246 deregisters the listener attribute, the listener state machine may be configured to transition from the Monitoring State to the Waiting State.

The talker state machine 236 may be configured to receive a Listener Deregister event when the talker state machine 236 is configured in any one of the Ready State, the Ready/Failed State, or the Failed State. When the talker state machine 236 is configured in the Ready State and the talker state machine 236 receives a Listener Deregister event, the talker state machine 236, the talker state machine 236 may be configured to stop the AVTP engine of the talker 230 and transition from the Ready State to the Waiting State. When the talker state machine 236 is configured in the Ready/Failed State and the talker state machine 236 receives a Listener Deregister event, the talker state machine 236 may be configured to stop the AVTP engine of the talker 230 and transition from the Ready/Failed State to the Waiting State. When the talker state machine 236 is configured in the Failed State and the talker state machine 236 receives a Listener Deregister event, the talker state machine 236 may be configured to transition from the Failed State to the Talker State.

The client 260 may also be configured to send instructions to the controller 290 to remove the connection of the data stream between the talker 230 and the listener 240. The client 260 may be configured to send the instructions to remove the connection through the application layer interface 262 of the client.

In response to receiving the instructions from the client 260 to remove the connection of the data stream, the controller 290 may be configured to send a message to the listener 240 that instructs the listener 240 to disconnect from the data stream. The message sent from the controller 290 to the listener 240 may be referred to as a Disconnect message. The Disconnect message may be sent from the application layer interface 292 of the controller 290 to the application layer interface 242 of the listener 240.

In response to receiving the Disconnect message, the listener 240 may be configured to remove the connection from the data stream. When the listener 240 receives the Disconnect message, the listener state machine 246 may be configured in either the Waiting State or the Monitoring State. When the Disconnect message is received and the listener state machine 246 is in the Waiting State, the listener state machine 246 may be configured to deregister one or more registered LAF attributes. If the listener state machine 246 has not registered any LAF attributes, then an action to deregister a LAF attribute may not be taken. After deregistering the LAF attribute, or determining that there are no registered LAF attributes to deregister, the listener 240 may transition from the Waiting State to the Initial State.

When the Disconnect message is received and the listener state machine 246 is in the Monitoring State, the listener state machine 246 may be configured to stop the AVTP engine to stop the flow of the data stream. The listener state machine 246 may also be configured to deregister one or more registered LR attributes. If the listener state machine 246 has not registered any LR attributes, then an action to register a LR attribute may not be taken. After deregistering the LR attribute, or determining that there are no registered LR attributes to deregister, the listener state machine 246 may issue an end_query function to the listener SRP stack 244. By issuing the end_query function to the listener SRP stack, the listener state machine 246 may remove from the listener SRP stack 244 any registrations pertaining to the stream ID associated with the stream from which the listener 240 has been instructed to disconnect. The end_query may be issued so that the listener SRP stack 244 no longer notifies the listener state machine 246 of registrations for which the listener 240 is no longer interested.

After issuing the end_query function, the listener state machine 240 may be configured to transition from the Monitoring State to the Initial State. In addition, after the listener state machine 246 stops the AVTP engine and deregisters any LR attributes and/or issues the end_query, and/or transitions from the Monitoring State to the Initial State, the listener 240 may send a Success message to the controller 290 indicating that the listener 240 successfully disconnected from the stream. The listener may send the Success message through the application layer interface 242 of the listener 240 and to the application layer interface 292 of the controller 290.

In response to receiving the Success message from the listener 240, the controller 290 may be configured to determine whether there are other listeners in the system that need to be instructed to disconnect from the stream. For example, referring back to the system 100, if the listener 140 sends a Success message to the controller 190, the controller 190 may determine to send a Disconnect message to the listener 141. In an alternative system, the controller 190 may be configured to send a Disconnect message to each listener 140, 141, 142 simultaneously. In another alternative system, the controller 190 may determine whether to send a Disconnect message to the listener 141 and/or the listener 142 before receiving a Success message from the listener 140.

After receiving Success messages from all of listeners, e.g., the listener 240 in the system 200, the controller 290 may be configured to send a message to the talker 230 that instructs the talker to remove the stream. The message to the talker 230 to remove the stream may be referred to as a Deallocate message. The controller 290 may send the Deallocate message to the talker 230 through the application layer interface 292 of the controller 290. The talker 232 may receive the Deallocate message through the application layer interface 232 of the talker 230.

In response to receiving the Deallocate message, the talker 230 may be configured to remove the data stream. When the talker 230 receives the Deallocate message, the talker state machine 236 may be configured in the Waiting State, the Ready State, the Ready/Failed State, or the Failed State. When the talker 230 receives the Deallocate message, the talker state machine 236 may be configured to transition to the Initial State regardless of the state in which the talker state machine is currently. For example, when the Deallocate message is received and the talker state machine 236 is in the Waiting State, the talker state machine 236 may be configured to transition from the Waiting State to the Initial State. When the Deallocate message is received and the talker state machine 236 is in the Ready State, the talker state machine 236 may be configured to stop the AVTP engine and the flow of the data stream. The talker state machine 236 may also be configured to deregister one or more registered talker attributes. If the listener state machine 236 has not registered any talker attributes, then an action to deregister a talker attribute may not be taken. After deregistering the talker attribute, or determining that there are no registered talker attributes to deregister, the talker state machine 236 may transition from the Ready State to the Initial State.

When the Deallocate message is received and the talker state machine 236 is in the Ready/Failed State, the talker state machine 236 may be configured to stop the AVTP engine and the flow of the data stream. The talker state machine 236 may also be configured to deregister one or more registered talker attributes. If the listener state machine 236 has not registered any talker attributes, then an action to deregister a talker attribute may not be taken. After deregistering the talker attribute, or determining that there are no registered talker attributes to deregister, the talker state machine 236 may transition from the Ready/Failed State to the Initial State.

When the Deallocate message is received and the talker state machine 236 is in the Failed State, the talker state machine 236 may be configured to deregister one or more registered talker attributes. If the listener state machine 236 has not registered any talker attributes, then an action to deregister a talker attribute may not be taken. After deregistering the talker attribute, or determining that there are no registered talker attributes to deregister, the talker state machine 236 may issue an end_query function to the talker SRP stack 234. By issuing the end_query, the listener state machine 236 may remove from the talker SRP stack 234 any registrations pertaining to the stream ID associated with the stream for which the talker 230 has been instructed to disconnect. The end_query may be issued so that the talker SRP stack 234 no longer notifies the talker state machine 236 of registrations for which the talker 230 is no longer interested. After the talker state machine 236 issues the end_query, the talker state machine 236 may transition from the Failed State to the Initial State.

After deregistering the talker attribute and before, during, or after the talker state machine 236 transitions from the Waiting State, the Ready State, the Ready/Failed State, or the Failed State, the talker 230 may send a Success message to the controller 290 indicating that the talker 230 successfully disconnected the stream. The talker 230 may send the Success message through the application layer interface 232 of the listener 230 and to the application layer interface 292 of the controller 290.

In response to receiving a success message from the talker 240, the controller 290 may be configured to send a message to the client 260 indicating that the stream is disconnected. The message from the controller 290 to the client 260 may be sent through the application layer interface 292 of the client 260. The message may be received by the client 260 through the application layer interface 262 of the client 260.

In one example, the TA or LR events may be changed as they propagate over the network 210 through the talker SRP stack 234 and/or the listener SRP stack 244. In one example, the system 200 may include components other than endpoints, such as the talker 230 and/or the listener 240, the controller 290, and/or the client 260. For example, the system 200 may include components such as switches and/or bridges. The switches and/or bridges may be responsible for determining if there is sufficient bandwidth to set up a new reservation through a given path. Where the system 200 includes switches and/or bridges, a bandwidth calculation may be performed by each switch and/or bridge that receives a TA or LR event. As long as the switch or bridge determines that there is sufficient bandwidth, the reservation is made in the switch or bridge and the TA or LR continues propagating. If there is not sufficient bandwidth for the stream to pass through the switch or bridge towards the target, such as the talker 230 or the listener 240, the switch or bridge will register a TF instead of the TA or a LAF instead of the LR, which will then continue propagating toward the listener or talker. During a time period that one or more registrations are active, the registrations may be periodically repeated and/or propagated so that other devices on the network 210, such as the talker 230, the listener 240, the client 260, and/or the controller 290, know that the registrations are still wanted. When one or more conditions change anywhere in a reserved path in such a way that bandwidth requirements for a stream can no longer be met, the switch identifying the changed conditions (i.e., the bottleneck switch) may change one or more listener registrations for the links with insufficient bandwidth and then propagate the changed listener registrations. For example, if there are multiple listener registrations for the stream, and if a switch or bridge in the path between the listener 240 and talker 230 determines that there is enough bandwidth for one or more, but not all, of the listener registrations for the stream, the switch or bridge converts the LR or LAF into a LRF instead, and the LRF is propagated to the talker 230.

Alternatively or in addition, the talker 230 and/or the listener 240 may be configured to send a Failure message to the controller 290 that is independent of any actions performed by the talker state machine 236 and/or the listener state machine 246. The failure message may be based on a failure that arises through a condition in the system 200 that are unrelated to the state machines 236, 246, such as full network queues or memory allocation failures. By reporting such failures to the controller 290, the talker 230 and/or the listener 240 may provide a way of notifying the system 200 of the failures so that the failures may be recovered at an upper level of the system, such as at the application layer.

The application layer interfaces 232, 242, 262, and/or 292 may be, may include, and/or may be referred to as an application layer module, an application layer interface module, an application layer, and/or an application layer stack. The application layer interfaces 232, 242, 262, and/or 292 may include software, hardware or some combination thereof executable by a processor. The application layer interfaces 232, 242, 262, and/or 292 may perform one or more administrative tasks for the respective system components 230, 240, 260 and/or 290, and/or may coordinate and/or orchestrate one or more components to ensure that the respective system components 230, 240, 260, and/or 290 performs tasks for which the system components 230, 240, 260, and/or 290 may be implemented.

The talker SRP stack 234 and/or the listener SRP stack 244 may alternatively be, may include, and/or may be referred to as a SRP module, a SRP stack module, a SRP layer module, a SRP, and/or a SRP application. The talker SRP stack 234 and/or the listener SRP stack 244 may include software, hardware or some combination thereof executable by a processor. The talker SRP stack 234 and/or the listener SRP stack 244 may communicate with and/or include memory and/or a database, which the talker SRP stack 234 and/or the listener SRP stack 244 may use to store information and/or data, such as information about data streams received. The memory and/or database accessible and utilized by the talker SRP stack 234 and/or the listener SRP stack 244 may be a part of the talker SRP stack 234 and/or the listener SRP stack 244, or may be a separate component of the talker 230 and/or the listener 240, such as memory 238 and/or memory 248. The memory 238 and/or the memory 248 may include and/or store instructions for operation and/or functions to be performed by the SRP stack 238 and/or the SRP stack 248. Various other examples are possible.

The talker state machine 236 and/or the listener state machine 246 may comprise computer instructions, computer code, digital logic, other software, hardware, or any combination thereof a part of which may be stored in the memory 238, the memory 248, and or any other storage device internal or external the talker 230 and/or the listener 240, and that is executable by one or more processors.

The memory 238 and/or the memory 248 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 238 and/or the memory 248 may include a cache or random access memory for a processor, such as processor 1002 of computer system 1000 described later. In alternative examples, the memory 238 and/or the memory 248 is separate from a processor, such as a cache memory of a processor, the system memory, or other memory. The memory 238 and/or the memory 248 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 238 and/or the memory 248 may be operable to store instructions executable by a processor. The functions, acts or tasks illustrated in the figures or described may be performed by a programmed processor executing the instructions stored in the memory 238 and/or the memory 248. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The talker SRP stack 234 and/or the listener SRP stack 244 may include, be connected with, and/or be in communication with attribute databases 235, 245, respectively. In one example, the attribute data base 235 and/or the attribute database 245 may comprise a MSRP attribute database. The attribute database 235 and/or the attribute database 245 may represent a memory, which may resemble and/or be similar to the memory 238 and/or the memory 248, a data storage bank, and/or various other components. The attribute databases 235 and/or the attribute database 245 may or may not be or include one or more features of a computer system, such as a computer system 1000 shown in FIG. 10 and described later. The attribute database 235 and/or the attribute database 245 may have an application programming interface ("API") which may be designed to notify an upper layer application whenever a new attribute, such as a talker attribute and/or talker stream ID, is registered on the network 210 and/or received by the talker SRP stack 234 and/or the listener SRP stack 244.

As mentioned, the talker 230 may have talker attributes, and/or the listener 240 may have listener attributes. The attribute database 235 and/or the attribute database 244 may represent a database including and/or storing one or more talker attributes and/or listener attributes. For example, the attribute database 235 may include attributes for the talker 230, and/or the attribute database 245 may include the attributes for the listener 240 on or connected with the network 210. The attribute database 235 and/or the attribute database 245 may store or identify where the talker 230 and/or listener 240 is, how much bandwidth a data stream from the talker 230 may require, how much bandwidth may be available for a listener 240, a unique stream ID for the talker 230 and/or listener 240, and/or various other pieces of information and/or data. The attribute database 235 and/or the attribute database 245 may, for example, store information and/or data indicating that the talker 230 with a first unique stream ID is connected with an Ethernet AVB network, identifying what information and/or data to request from the network 210 and/or controller 290 to obtain and/or register for the data stream from the talker 230, and what percentage of an Ethernet connection will be used if the listener 240 has registered for, and/or begins receiving, the data stream from the talker 230. Information and/or data received by the attribute database 235 and/or the attribute database 245, such as one or more data streams from the network 210, may be transmitted, output, sent, and/or passed from the talker SRP stack 234 and/or the listener SRP stack 244 to the application layer interface 232 and/or the application layer interface 242.

In some systems, the attribute database 235 of the talker 230 and/or the attribute database 245 of the listener 240 may be created and/or updated from a separate and/or collective attribute database. This separate and/or collective attribute database may represent one database for both the talker 230 and the listener 240. Referring back to the system 100 shown in FIG. 1, where there are multiple talkers 130, 131, 132 and/or multiple listeners 140, 141, 142, this separate and/or collective attribute database may represent one database for multiple or all of the talkers 130, 131, and 132 and/or all of the listeners 140, 141, and 142. For example, a separate and/or collective MSRP attribute database may be attached and/or in communication with the network 110, and/or may store information and/or data about one or more talkers 130, 131, and 132 and/or listeners 140, 141, and 142. Alternatively or in addition, each talker 130, 131, and 132 and/or each listener 140, 141, and 142 may include an attribute database and/or may have access to the separate and/or collective MSRP attribute database.

The attribute database 235 and/or the attribute database 245 may be a copy of, and/or include information from, the separate and/or collective attribute database. In such systems, the separate and/or collective attribute database may be continuously updated, or updated at various other intervals. In some systems, the separate and/or collective attribute database may collect and/or update information based on information and/or data about data streams received and/or stored in each of the SRP attribute databases 235, 245. Updates may be sent by the separate and/or collective attribute database to the attribute database 235 and/or the attribute database 245 at various intervals, such as every 10-15 seconds or so. In these systems, the attribute database 235 and/or the attribute database 245 may be the same.

In an alternative example, the attribute database 235 and/or the attribute database 245 may not be included in the talker 230 and/or the listener 240, but may exist separately and/or be in communication with the talker 230 and/or the listener. In another alternative example, parts of a separate and/or collective attribute database may be extracted from an external database and stored in volatile memory in the talker 230 and/or the listener 240 when the talker 230 and/or the listener 240 is powered up. Various other examples, functions and/or features of the attribute database 235 and/or the attribute database 245 are possible.

Figure 3:
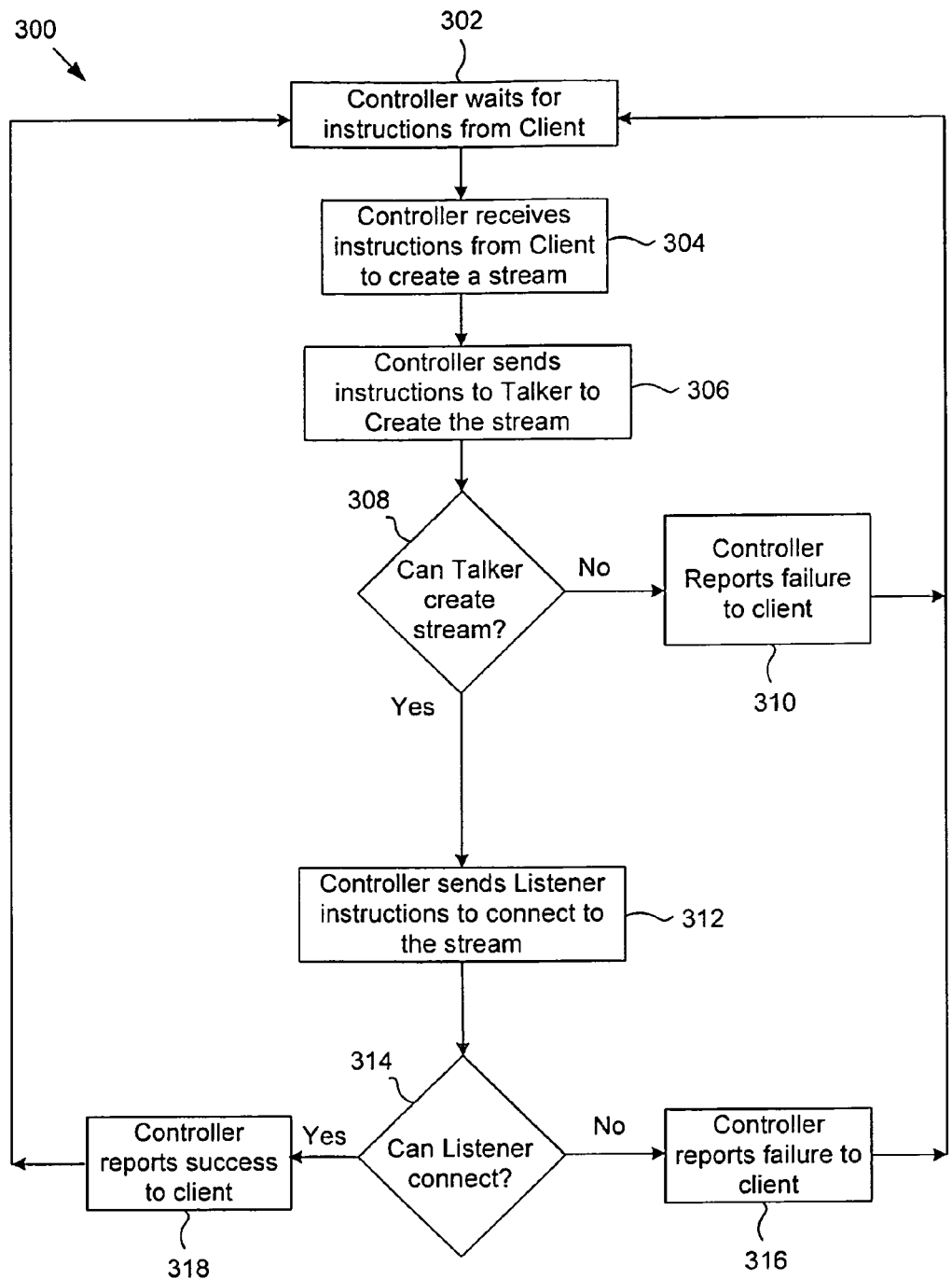
FIG. 3 is a flow diagram of an example method that a controller may perform for creating a data stream between a talker and a listener in an Ethernet AVB network.

FIG. 3 shows a flow chart of an example method 300 that a controller may perform in a system that communicates over an Ethernet AVB network for creating a data stream between a talker and a listener in the Ethernet AVB network. The method begins at block 302 where the controller may be configured in an initial state and waits for instructions from a client to create a data stream between the talker and the listener. At block 304, the controller receives instructions from the client to create the data stream. The instructions may be sent over a high-level layer of the system, such as an application layer. The client may send the instructions through an application layer interface. In one example, the application layer interface is a function block ("FBlock") interface. The controller may be configured to receive the instructions from the client at the application layer, such as through an application layer interface of the controller.

At block 306, in response to receiving instructions from the client to create the data stream, the controller may be configured to send an Allocate message to the talker that instructs the talker to create the data stream. The Allocate message may be sent from the application layer interface of the controller over an Ethernet AVB network layer of the system to an application layer interface, such as a FBlock interface, of the talker. The Allocate message may include various parameters, including a SourceNr parameter indicating a number of data source, one or more destination addresses to which the data stream is to be sent, a presentation delay of the data stream, a rank of the data stream (e.g., a first indicator may indicate an emergency rank and a second indicator may indicate a non-emergency rank), a virtual local area network (VLAN) identifier used for the data stream, and/or a class of the data stream (e.g., a first indicator may indicate class A, and a second indicator may indicate class B).

At block 308, the controller determines whether the talker can create the data stream. The controller may determine whether the talker can create the data stream based on receiving a response message from the talker and identifying whether the response message is a Success message or a Failure message. The response message may be sent through the application layer interface of the talker. The Success Message may indicate that the talker is able to create the data stream. The Success Message may be sent by the talker to the controller after and/or during the talker performing a series of actions, including issuing a query to a SRP stack in the talker and/or the system, registering a Talker Advertise attribute, and/or transitioning from an Initial State to a Waiting State for a Listener Ready event. The Success Message may include a stream ID that identifies the data stream that the client is able to create. The Failure Message may or may not be related to whether the talker has the resources and/or the bandwidth to create the data stream. For example, the Failure Message may be unrelated and may be received by the controller if a failure arises through a failure condition in the system, such as full network queues or memory allocation failures. If the controller receives the Failure message from the talker, then the controller may determine that the talker is unable to create the stream and reports the failure to the client at block 316. The method may then proceed back to block 302 where the controller waits for another instruction from the client. If the controller receives the Success message from the listener, the method may proceed to block 318.

At block 318, in response to receiving the Success message from the listener, the controller may be configured to report a Success message to the client indicating that the talker and the listener are able to establish a connection for the data stream. The message from the controller to the client may be sent through the application layer interface of the controller and received at the application layer interface of the client. The method may then proceed to block 302 where the controller waits for another instruction from the client.

Figure 4:
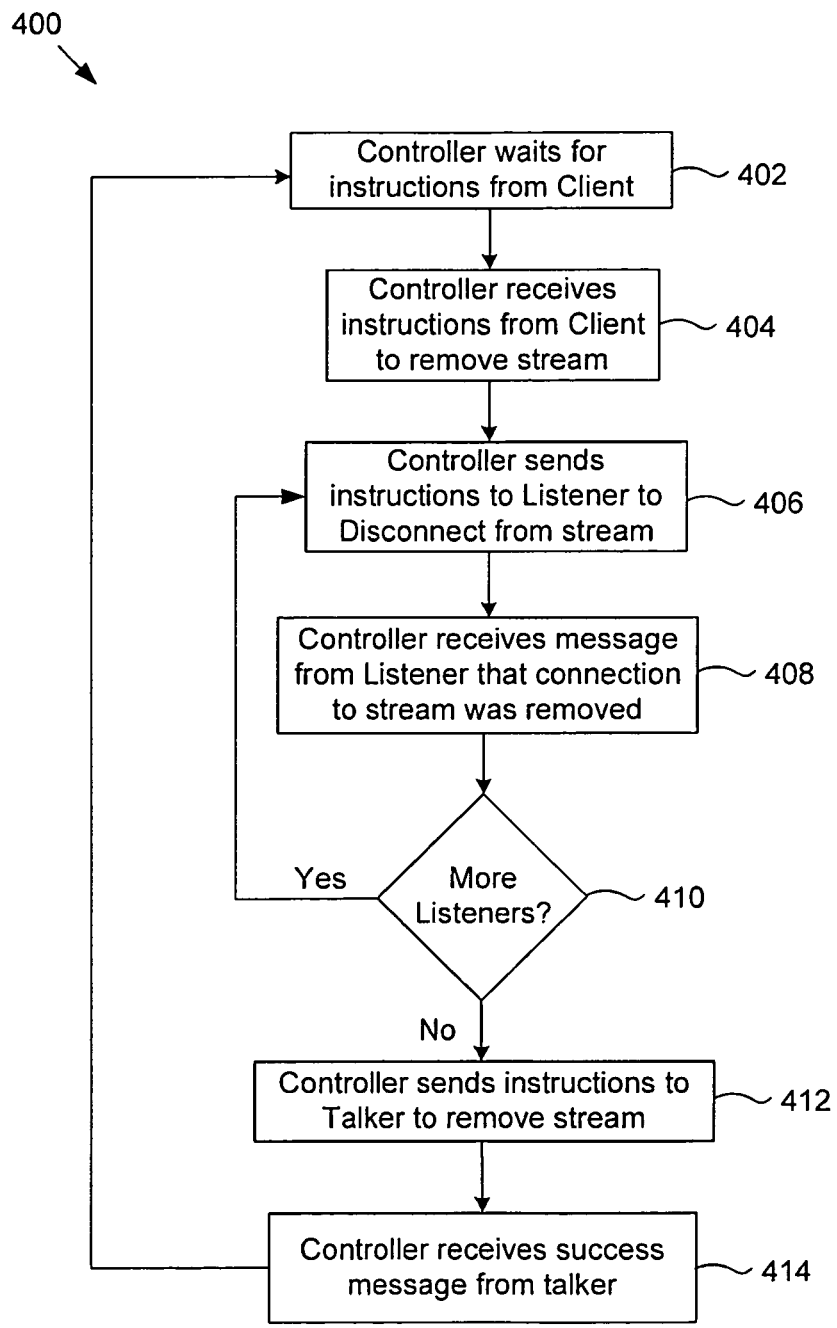
FIG. 4 is a flow diagram that a controller may perform for removing a data stream between a talker and one or more listeners in an Ethernet AVB network.

FIG. 4 shows a flow chart of an example method 400 that a controller may perform in a system that communicates over an Ethernet AVB network for removing a data stream between a talker and one or more listeners in the Ethernet AVB network. The method begins at block 402 where the controller waits for instructions from a client to remove the data stream between the talker and the listener. At block 404, the controller receives instructions from the client to remove the data stream. The instructions may be sent over a high-level layer of the system, such as an application layer. The client may send the instructions through an application layer interface. In one example, the application layer interface is a function block ("FBlock") interface. The controller may be configured to receive the instructions from the client at the application layer, such as through an application layer interface of the controller.

At block 406, in response to receiving instructions from the client to remove the data stream from the client, the controller may be configured to send a Disconnect message to the listener that instructs the listener to disconnect from the data stream. The Disconnect message may be sent from the application layer interface of the controller over an Ethernet AVB network layer of the system to an application layer interface, such as a FBlock interface, of the listener. At block 408, the controller receives a message from the listener that the connection was removed. The message may be sent from the listener through the application layer interface of the listener. Before and/or concurrently with sending the message to the controller, the listener may perform a series of steps, including stopping the AVTP engine of the listener, deregistering, if any, listener attributes, issuing an end_query to an SRP stack to remove any registrations associated with a stream ID for which the listener is no longer interested in, and transitioning from a Monitoring State to a Listening State.

At block 410, after receiving the message from the listener, the controller may determine if more listeners are to be disconnected from the stream. If there are more listeners to be disconnected from the stream, then the method proceeds back to block 406, where the controller determines another listener and sends the listener instructions to disconnect from the stream. Alternatively, the listener may determine all of the listeners to be disconnected from the stream prior to sending one or more messages to the listeners to disconnect from the stream. After identifying all of the listeners, the controller may then send all of the disconnect messages to all of the listeners concurrently. Alternatively, the controller may not send all of the Disconnect messages to all of the listeners concurrently, but nevertheless may send a Disconnect message to another listener before receiving a response from the initial listener.

When the listener determines that all of the listeners have responded that they have disconnected from the stream, then at block 412 the controller may be configured to send a Deallocate message to the talker that instructs the talker to remove the stream. The Deallocate message may be sent from through application layer interface of the controller and be received at an application layer interface of the talker. The application layer interface of the talker may be a FBlock interface. The talker may perform a series of actions to remove the connection, including stopping the AVTP engine of the listener, deregistering any talker attributes, issuing an end_query function to a SRP stack, and/or transitioning to an Initial State. At block 414, the controller may receive a message from talker that removal of the stream was successful. The method returns back to block 402 where the controller waits for instructions from the client.

Figure 5:
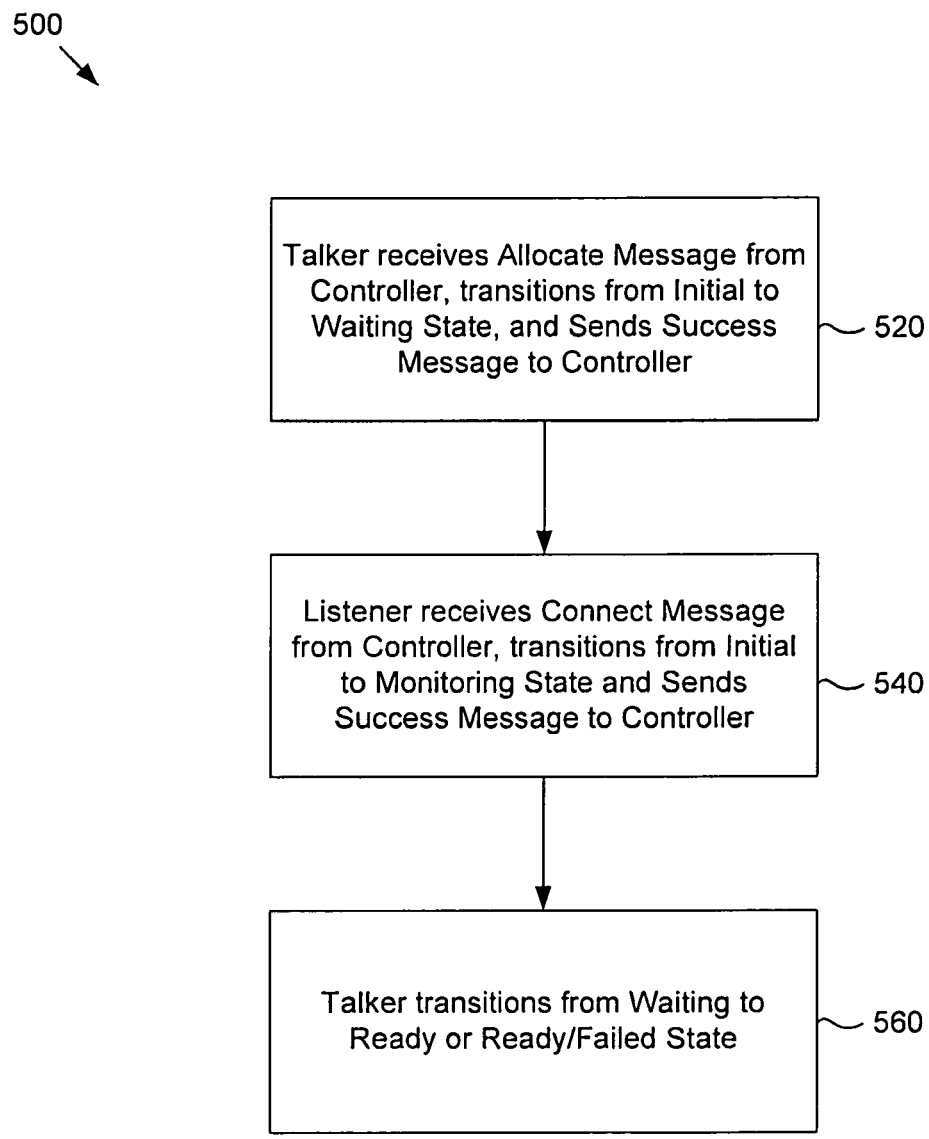
FIG. 5 is a flow diagram of an example method that a talker and a listener may perform for creating a data stream between a talker and a listener based on instructions received from a controller.

FIG. 5 shows a flow chart of an example method that a talker and a listener in an Ethernet AVB network may perform for creating a data stream between the talker and the listener based on instructions received from a controller. The method begins at block 520 where the talker receives an Allocate message from a controller that instructs the talker to create a data stream. The Allocate message may be received by the talker through a high-level application layer interface, such as a FBlock interface of the talker. In response to receiving the Allocate message, the talker may be configured to transition from an Initial State to a Waiting State, where the talker waits for notification of a registration by the listener. The talker may also be configured to send a Success message to the controller, indicating that the talker is able to create the data stream. The talker may send the Success message to the controller through the application layer interface. The Success message may include a stream ID that identifies the stream to which the talker is able to create.

After the talker sends the Success message to the controller, at block 540 the listener may be configured to receive a Connect message from the controller. The Connect message may be received through a high-level application layer interface, such as a FBlock interface, of the listener. The Connect message may include the stream ID that the talker sent to the controller. After receiving the Connect message, the listener may be configured to transition from an Initial State to a Monitoring State. In order to transition from the Initial State to the Monitoring State, the listener may be configured to perform a series of actions including issuing a query to a SRP stack, process a received Talker Advertise event, start the AVTP engine of the listener, and/or register a listener attribute.

After the talker registers a Listener Ready attribute, then at block 560 the receives a Listener Ready event indicating that the listener registered the Listener Ready attribute, starts the AVTP engine of the talker, and transitions from the Waiting State to the Ready or Ready/Failed State. When starting the AVTP engine and transitioning to the Ready or Ready/Failed State, a connection between the talker and the listener has been established and the data stream may flow from the talker to the listener.

Figure 6:
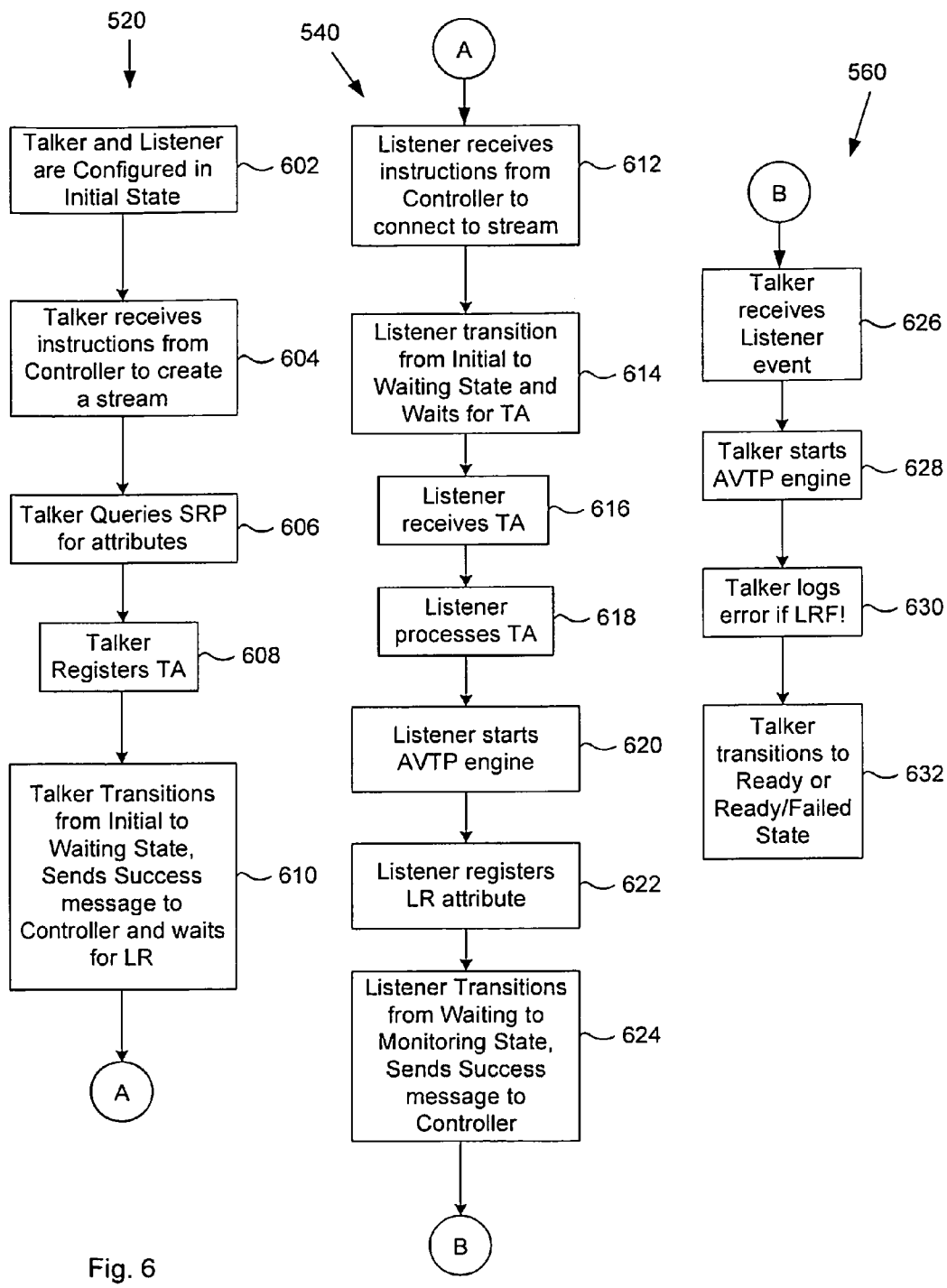
FIG. 6 is a flow diagram of the example method of FIG. 5 in greater detail.

FIG. 6 shows the flow chart of the example method of FIG. 5 in greater detail. The flow chart shown in FIG. 6 shows the blocks 602-632 grouped into three rows to indicate the blocks that are associated with the blocks 520, 540, and 560 shown in FIG. 5. Blocks 602-610 may be associated with block 520, blocks 612-624 may be associated with block 540, and blocks 626-632 may be associated with block 560. Other associations or combinations may be determined. The method begins at block 602 where the talker and the listener are configured in an Initial State. At block 604, the talker receives instructions, included in an Allocate message, to create a data stream. The message may be received through an application layer interface, such as a FBlock interface, of the talker. At block 606, in response to receiving the Allocate message, the talker may issue a query to a SRP stack. The query to the SRP stack may inform the SRP stack of a stream ID for a stream that the talker is interested in creating. Without issuing the query, the talker may not determine a Listener Ready event ("LR!") that is associated with the stream ID. After the query is issued, any LR registered in the SRP stack by the listener for that stream ID may be determined by the talker.

At block 608, the talker may register a Talker Advertise (TA) attribute. Registering the TA attribute may announce to the Ethernet AVB network that the talker is able to reserve the bandwidth and/or resources that are necessary to reserve the stream. When the talker registers the TA attribute, the SRP stack may notify the listener of the registration and the stream for which it is being registered. After the talker registers the TA attribute, at block 610, the talker may transition from the Initial State to a Waiting State, where the talker waits for an event triggered by a listener registration, such as a LR event. In addition, after the TA attribute registration, the talker may be configured to send a Success message to the controller, indicating that the talker is able to create the data stream. The talker may send the Success message to the controller by sending the Success message through the application layer interface of the talker. The Success message to the controller may include the stream ID for the stream that the talker has reserved.

At block 612, the listener may receive a Connect message from the controller that instructs the listener connect to the stream. The connect message may include the stream ID that the talker included in the Success message to the controller. The listener may receive the Connect message through a high-level application layer interface, such as a FBlock interface. At block 614, in response to receiving the Connect message, the listener may transition from the Initial State to the Waiting State where it waits for notification of the registration of the TA attribute by the talker. At block 616, the listener receives a message that the talker registered the TA attribute. The listener may receive the notification through the SRP stack. When the talker registered the TA attribute at block 608, the registration may trigger a TA event, which notifies the listener of the TA attribute registration at block 616. At block 618, the talker processes the TA message. Processing the TA message may include retrieving a destination address (DA) of the stream, which may be necessary for programming an Ethernet adapter of the listener to receive frames addressed to that multicast address.

At block 620, the listener may start the AVTP engine in order to recognize and/or process the data stream. At block 622, the listener registers a Listener Ready ("LR") attribute. The listener may register the LR attribute to announce to the network and/or the talker that the listener may connect, is reserving, or has reserved connection to the data stream. At block 624, the listener may transition from the Waiting State to a Monitoring State. In the Monitoring State, the listener may be monitoring for indications that the stream to which it is connected and/or for which has made the reservation for has terminated, either normally or abnormally. The listener may monitor the stream itself or messages received through the application layer interface, the SRP stack, and/or other components or modules of the listener that may be configured to monitor and/or detect a stream's termination. In one example, the listener may be monitoring for a Talker Failed event ("TF!"), which may be an indication of an abnormal termination of the stream's reservation. As another example, the listener may be monitoring for a Talker Deregister event ("TalkerDeregister!"), which may indicate a normal termination of the stream's reservation. As another example, the listener may be monitoring for a Disconnect event ("Disconnect!"), which may be a message or command from the controller that the client and/or the controller no longer wants the listener to listen to the stream. At block 624, the listener may also be configured to send a Success message to the controller, indicating that the listener successfully connected to and or reserved reservation for the data stream. The listener may be configured to issue the Success message through the application layer interface of the listener.

Although the controller and/or the client may determine that a connection for a data stream can be established after the controller receives the Success message from the listener, the talker may not form the connection and/or begin streaming the data until it receives notification of a Ready registration from the listener. At block 626, the talker receives a Ready event. The Ready event may be triggered when the listener registered the Listener Ready attribute. In an alternative example method, where there is more than one listener, if a switch or bridge in the AVB network determines that there is sufficient bandwidth for at least one but not all of the listeners to receive the stream, then the switch or bridge may convert the Ready event to a Ready/Failed event. The talker may receive the Ready event of the Ready/Failed event through the SRP stack.

In response to receiving the Ready event or the Ready/Failed event, at block 628, the talker starts the AVTP engine and the data stream may flow from the talker to one or more listeners that registered a Listener Ready attribute associated with the stream ID of the stream. At block 630, if the talker received a Ready/Failed event, the talker may log one or more errors associated with the one or more listeners that were not able to accept the data stream. At block 632, the talker transition from the Waiting State to the Ready or the Ready/Failed State depending on the listener event received by the talker at block 626. After starting the AVTP engine and/or transitioning to the Ready or Ready/Failed State, the connection of the data stream between the talker and the listener is established and the data stream is successfully flowing from the talker to the listener.

Figure 7:
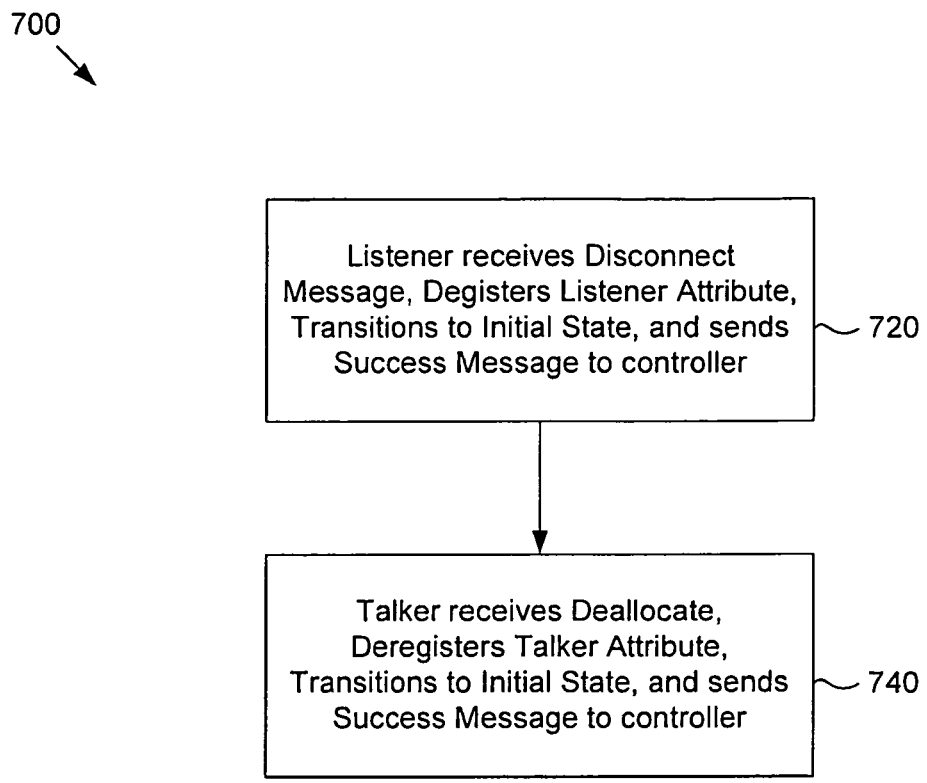
FIG. 7 is a flow diagram of an example method that a talker and a listener may perform for removing a data stream between the talker and the listener based on instructions received from a controller.

FIG. 7 shows a flow chart of an example method that a talker and a listener in an Ethernet AVB environment may perform for removing a data stream between the talker and the listener based on instructions received from a controller. The method begins at block 720, where the listener receives a Disconnect message from the controller, which instructs the listener to remove its connection to the data stream. The listener may receive the Disconnect message through a high-level application layer interface, such as a FBlock interface. In response to receiving the Disconnect message, the listener may be configured to deregister any listener attributes, such as Listener Ready attributes, that the listener ready with a SRP stack and/or issue an end_query to the SRP stack. In addition, in response to the Disconnect message, the listener may be configured to transition from the Monitoring State to the Initial State. In addition, the listener may send a Success message to the controller indicating that the listener successfully removed its connection to the data stream. The listener may send the Success message through the application layer interface of the listener.

At block 740, the talker may receive a Deallocate message from the controller, which may instruct the controller to remove the data stream. The talker may receive the Deallocate message from controller in response to the listener sending the Success message to the controller. The talker may receive the Deallocate message through a high-level application layer interface, such as a FBlock interface, of the talker. In response to receiving the Deallocate message, the talker may stop the AVTP machine, deregister any registered talker attributes and transition from the Ready or the Ready/Failed State to the Initial State.

Figure 8:
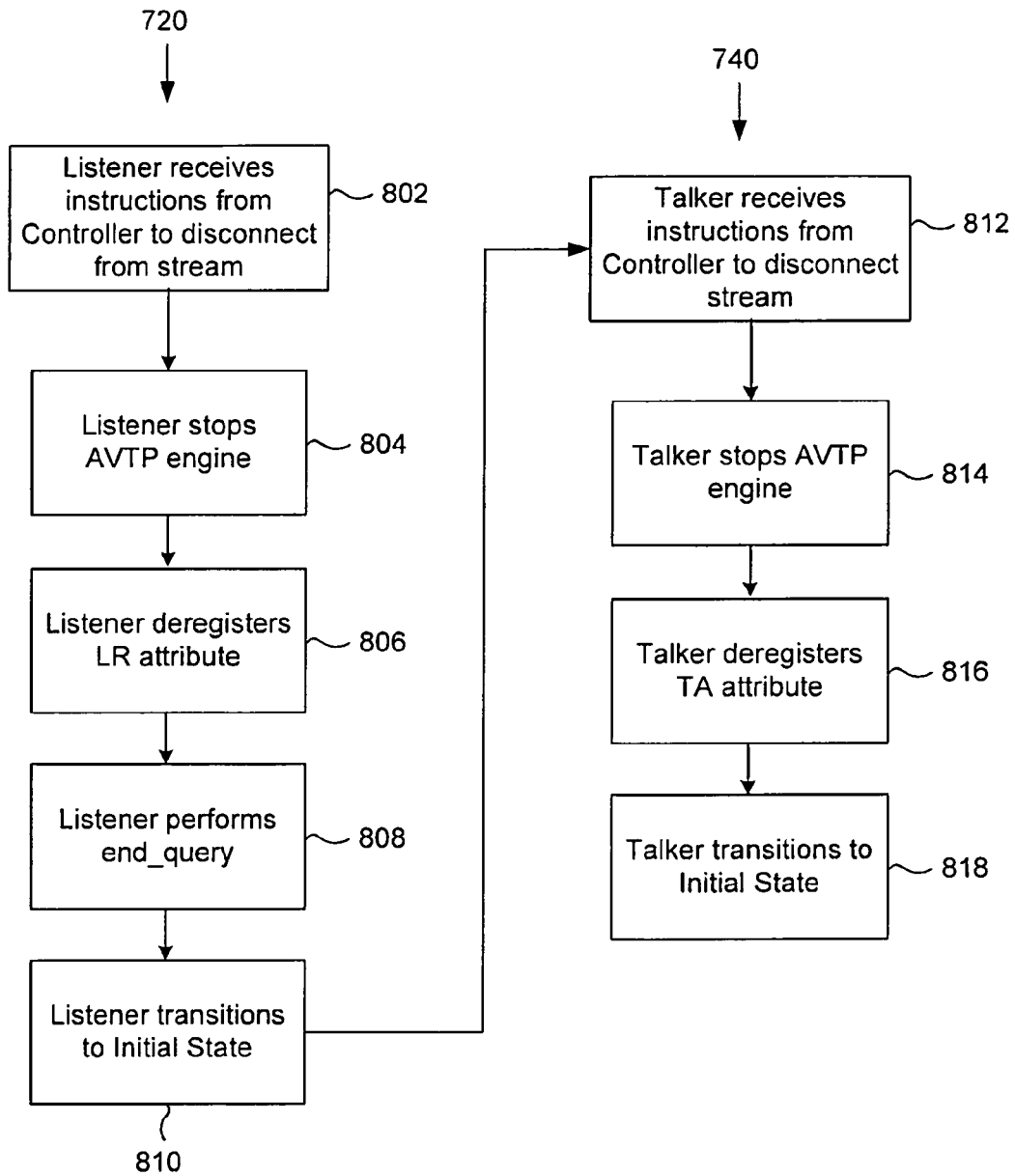
FIG. 8 is a flow diagram of the example method of FIG. 7 in greater detail.

FIG. 8 shows the flow chart of the example method of FIG. 7 in greater detail. The flow chart shown in FIG. 8 shows the blocks 802-818 grouped into two rows to indicate the blocks that are associated with the blocks 720 and 740 shown in FIG. 7. Blocks 802-810 may be associated with block 720, and blocks 812-818 may be associated with block 740. Other associations or combinations may be determined. The method begins at block 802 where the listener receives instructions from the controller to disconnect from the stream. The listener may receive instructions as a Disconnect message. The Disconnect message may be received through a high-level application layer interface of the listener. At block 804, in response to receiving to receiving the Disconnect message, the listener may stop the AVTP engine, which may stop the listener's recognition of the data stream even though the data stream may still be flowing to the listener. At block 806, the listener may deregister one or more registered Listener Ready attributes. If the listener has not registered any LR attributes, then an action to deregister a LR attribute may not be taken. After deregistering any LR attributes, or determining that there are no registered LR attributes to deregister, at block 808, the listener may issue an end_query function to the SRP stack. By issuing the end_query function to the SRP stack, the listener may remove from the SRP stack any registrations pertaining to the stream ID associated with the stream from which the listener has been instructed to disconnect. The end_query may be issued so that the listener is no longer notified of registrations for which the listener is no longer interested.

At block 810, the listener may transition from the Monitoring State to the Initial State. In addition, the listener may send a Success message to the controller indicating that the listener successfully disconnected from the stream. The listener may send the Success message through the application layer interface of the listener.

At block 812, in response to receiving the Success message from the listener, the talker may receive a Deallocate message from the controller that instructs the talker to remove the stream. The talker may receive the Deallocate message through the application layer interface of the talker. At block 814, the talker may stop the AVTP engine of the talker, which may stop the data stream from streaming through the network. At block 816, the talker deregisters one or more registered talker attributes. If no attributes are registered, then an action to deregister a talker attribute may not be taken. After deregistering the talker attribute, or determining that there are no registered talker attributes to deregister, at block 818, the talker may transition from the Ready State to the Initial State. Also, at block 818, the talker may send a Success message to the controller indicating that the talker successfully disconnected the stream. The talker may send the Success message through the application layer interface of the talker. After stopping the AVTP engine of the talker, deregistering any talker attributes, and/or transitioning to the Initial State, the connection of the data stream between the talker and the listener is successfully removed.

Figure 9:
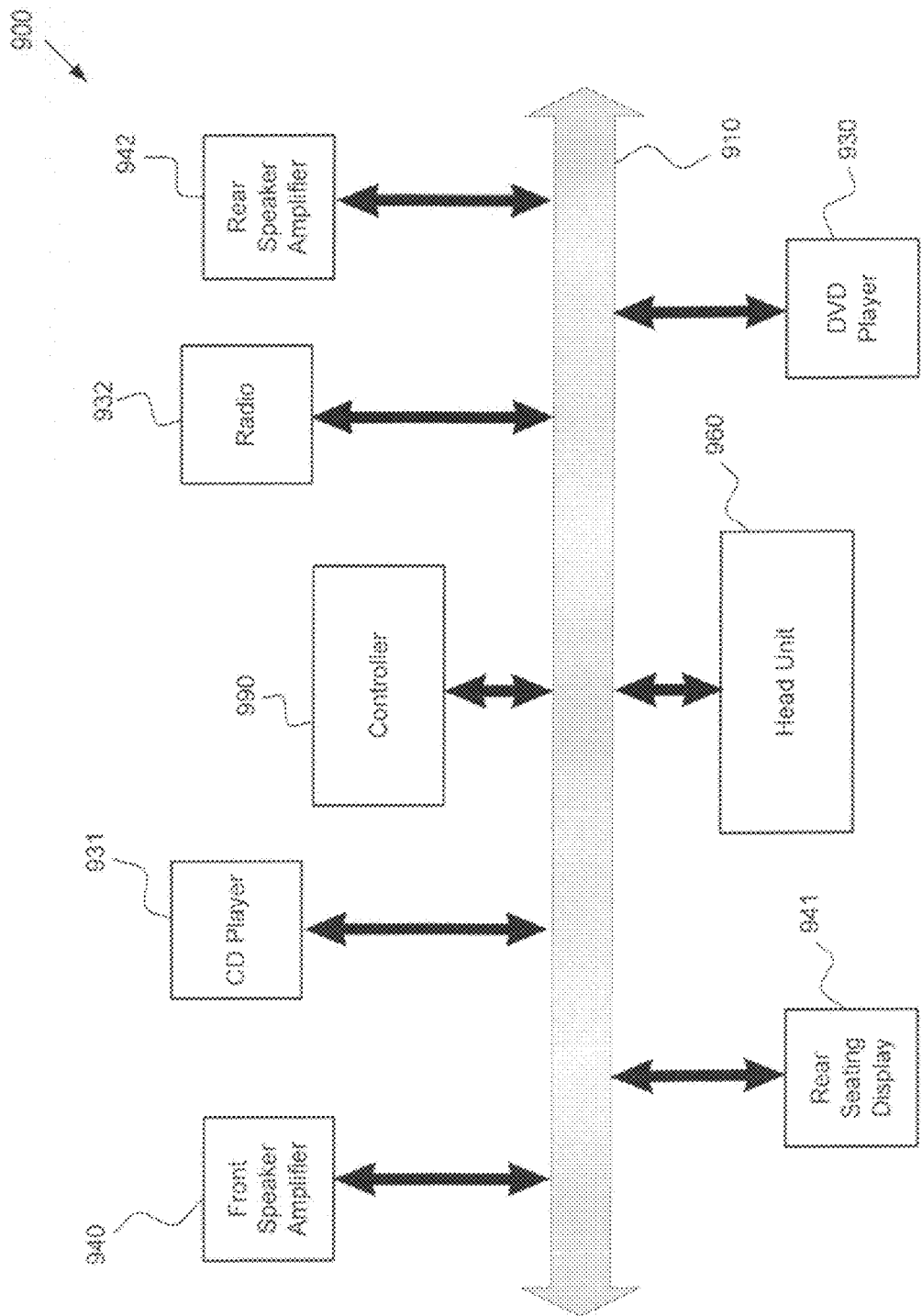
FIG. 9 is a block diagram of an example network communication system.

FIG. 9 shows an example system 900 that includes a controller 990, a client 960, one or more talkers 930, 931, 932, and one or more listener 940, 941, 942. The example system 900 may comprise an automobile communication system. The talkers of the automobile communication system 900 may include a DVD player 930, a CD player 931, and/or a radio 932. The listeners of the automobile communication system 900 may include a front speaker amplifier 940, a rear seating display 941, and a rear amplifier 942. The client of the automobile communication system may be a head unit 960. The head unit 960 may include various controls such as volume controls, channel controls, DVD player and/or CD player controls such as play, stop, fast forward, rewind, and pause. Other controls may be included in the head unit. The controls may be operated by a user of the communication system 900, such as a driver or a passenger of the automobile. The user may operate the head unit 960 to control the talkers 930, 931, 932 and/or the listeners 940, 941, 942. For example, if a user wants to lower the volume of music in the automobile, the user may operate a volume knob on the head unit 960, which may control the front speaker amplifier 940 and/or the rear speaker amplifier 942.

The talkers 930, 931, 932, the listeners 940, 941, 942, the head unit 960, and the controller 990 may be in communication with one or more of each other by communicating over the network 910. The network 910 may be an Ethernet AVB network. Data streams transmitted from the talkers to the listeners may be sent over one or more Ethernet cables comprising the Ethernet AVB network. To reserve and/or remove a reservation for a stream between the talkers and the listeners, the network 910 may use the Stream Reservation Protocol as described in IEEE 802.1Qat-2010. The SRP may be used by communicating through a SRP stack that is included in or accessible by the components 930, 931, 932, 940, 941, 942, 960 of the system. The control signals for controlling the data streams may also be sent over the Ethernet cables. In addition, the control signals may be initiated, generated, received, and/or processed at a high-level application layer of the system 900. The control signals may be communicated over the Ethernet AVB network to and from the application layer through application layer interfaces. Each of the DVD player, 930 CD player 931, radio 932, front speaker amplifier 940, rear seating display 941, rear speaker amplifier 942, and/or head unit have an application layer interface. In one example, the application layer interface comprises an FBlock interface. Where the components of the system 900 have an FBlock interface, the controls signals sent over the network 910 may comprise FBlock control signals. The controller 990 may be configured to send and/or receive control signals, such as FBlock control signals, to each of the components 930, 931, 932, 940, 941, 942, and 960 of the system 900. The controller 990 may be or may include an application layer interface to send and/or receive the control signals.

An exemplary operation of the system 900 may include a driver of the automobile that wishes to start a DVD for a passenger in a rear seat of the automobile. To start the DVD, the driver may press a "Play" button that is in communication with the head unit 960. The head unit 960, recognizing that the "Play" button was pressed, sends a "Play" command to the controller 990 that instructs the controller 990 to create a A/V stream between the DVD player 930 and the rear seating display 941. The controller 990, upon receiving the instructions from the head unit 960, sends an Allocate message to the DVD player 930, instructing the DVD player 930 to create a stream. Upon receipt of the Allocate message, the DVD player 930, or a talker operable with the DVD player 930, may perform one or more actions using one or more state machines to create the stream. For example, the DVD player 930 may query the SRP stack of the DVD player 930 so that the DVD player 930 may be notified of any registrations associated with the stream. The DVD player 930 may register a Talker Advertise attribute with the SRP stack to announce the DVD player's creation of the stream, and then the DVD player may transition to a Waiting State where it waits to receive a Listener Ready event due to a Listener Ready registration from the rear seating display 941 operating as a listener. The DVD player 930 may also send a Success message to the controller 990. The DVD player may send the Success message to the controller through an application layer interface, such as an FBlock interface, of the DVD player 930. The Success message may include a stream ID identifying the stream that the DVD player wants to create.

The controller 990 may receive the Success message from the DVD player, and in response, may send a Connect message to the rear seating display 941, including the stream ID in the Connect message. Upon receipt of the Connect message, the rear seating display 941, using a state machine, may issue a query to a SRP stack so that the SRP stack receives notification of any talker attribute registrations associated with the stream ID of the stream that the rear seat display 941 wants to be connected to. In addition, the rear seat display 941 may receive a Talker Advertise event through the SRP stack due to the Talker Advertise registration performed by the DVD player. Upon receipt of the Talker Advertise event, the rear seating display 941 may process the Talker Advertise event, start the AVTP engine of the rear seating display 941 so that the rear seating display can recognize the media stream sent by the DVD player 930, register a Listener Ready attribute to announce that can accept the media stream, and then transitions to a Monitoring State, where the rear seating display 941 monitors the media stream, or signals sent through the SRP stack or the application layer interface.

When the rear seating display 941 registered the Listener Ready attribute, a Listener Ready event may be propagated through the SRP stack and received by the DVD player 930. When DVD player 930 identifies the Listener Ready event, the DVD player 930 may start the AVTP engine to start the media flow and then transitions to a Ready State, where the DVD player 930 operates under the configuration that all of the listeners can accept the media stream, and in which a connection of the media stream between the DVD player 930 and the rear seating display 941 is successfully established.

The above operation is merely exemplary and other operations may be performed on the system 900 or other systems involving talkers and listeners in an Ethernet AVB environment in accordance with the above descriptions.

Figure 10:
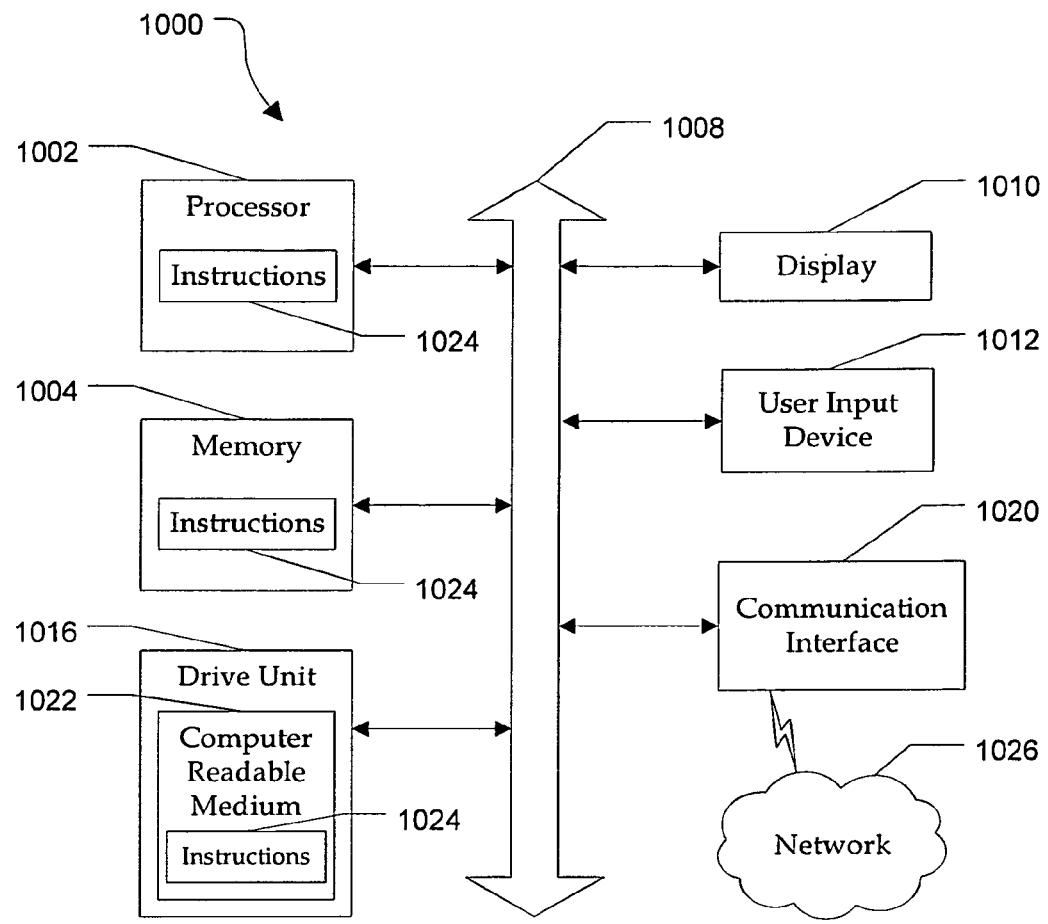
FIG. 10 is an example of a processing system for use with one or more components in the network communication system.

One or more of the talkers, such as talker 130, 131, and 132, listeners 140, 141, and 142, talker/listeners 150, and/or controllers 190 shown in FIG. 1, may be and/or may include a portion or all of one or more computing devices of various kinds, such as the computing device in FIG. 10. FIG. 10 illustrates an example of a general computer system designated 1000. Any of the components from the system 100 and/or the system 200 may include a portion or all of the computer system 1000. For example, in some examples, the computer system 1000 may include only a processor and memory. The computer system 1000 can include a set of instructions that can be executed to cause the computer system 1000 to perform any one or more of the methods or computer based functions disclosed. The computer system 1000 may operate as a standalone device or may be connected, e.g., using a network, to other computer systems or peripheral devices.

In a networked deployment, the computer system 1000 may operate in the capacity of a server or as a client user computer in a server-client user network environment, or as a peer computer system in a peer-to-peer (or distributed) network environment. The computer system 1000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular example, the computer system 1000 can be implemented using electronic devices that provide voice, audio, video or data communication. Further, while a single computer system 1000 is illustrated, the term "system" shall also be taken to include any collection of systems or sub-systems that individually or jointly execute a set, or multiple sets, of instructions to perform one or more computer functions.

In FIG. 10, the example computer system 1000 may include a processor 1002, e.g., a central processing unit (CPU), a graphics processing unit (GPU), or both. The processor 1002 may be a component in a variety of systems. For example, the processor 1002 may be part of a standard personal computer or a workstation. The processor 1002 may be one or more general processors, digital signal processors, application specific integrated circuits, field programmable gate arrays, servers, networks, digital circuits, analog circuits, combinations thereof, or other now known or later developed devices for analyzing and processing data. The processor 1002 may implement a software program, such as code generated manually (i.e., programmed).

The term "module" may be defined to include a plurality of executable modules. As described herein, the modules are defined to include software, hardware or some combination thereof executable by a processor, such as processor 1002. Software modules may include instructions stored in memory, such as memory 1004, or another memory device, that are executable by the processor 1002 or other processor. Hardware modules may include various devices, components, circuits, gates, circuit boards, and the like that are executable, directed, and/or controlled for performance by the processor 1002.

The computer system 1000 may include a memory 1004, such as a memory 1004 that can communicate via a bus 1008. The memory 1004 may be a main memory, a static memory, or a dynamic memory. The memory 1004 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1004 includes a cache or random access memory for the processor 1002. In alternative examples, the memory 1004 is separate from the processor 1002, such as a cache memory of a processor, the system memory, or other memory. The memory 1004 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1004 is operable to store instructions executable by the processor 1002. The functions, acts or tasks illustrated in the figures or described may be performed by the programmed processor 1002 executing the instructions stored in the memory 1004. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 1000 may or may not further include a display unit 1010, such as a liquid crystal display (LCD), an organic light emitting diode (OLED), a flat panel display, a solid state display, a cathode ray tube (CRT), a projector, a printer or other now known or later developed display device for outputting determined information. The display 1010 may act as an interface for the user to see the functioning of the processor 1002, or specifically as an interface with the software stored in the memory 1004 or in the drive unit 1016.

Additionally, the computer system 1000 may include an input device 1012 configured to allow a user to interact with any of the components of system 1000. The input device 1012 may be a number pad, a keyboard, or a cursor control device, such as a mouse, or a joystick, touch screen display, remote control or any other device operative to interact with the computer system 1000.

In a particular example, as depicted in FIG. 10, the computer system 1000 may also include a disk or optical drive unit 1016. The disk drive unit 1016 may include a computer-readable medium 1022 in which one or more sets of instructions 1024, e.g. software, can be embedded. Further, the instructions 1024 may embody one or more of the methods or logic as described. In a particular example, the instructions 1024 may reside completely, or at least partially, within the memory 1004 and/or within the processor 1002 during execution by the computer system 1000. The memory 1004 and the processor 1002 also may include computer-readable media as discussed above.

The present disclosure contemplates a computer-readable medium that includes instructions 1024 or receives and executes instructions 1024 responsive to a propagated signal so that a device connected to a network 1026 can communicate voice, video, audio, images or any other data over the network 1026. Further, the instructions 1024 may be transmitted or received over the network 1026 via a communication port or interface 1020, and/or using a bus 1008. The communication port or interface 1020 may be a part of the processor 1002 or may be a separate component. The communication port 1020 may be created in software or may be a physical connection in hardware. The communication port 1020 may be configured to connect with a network 1026, external media, the display 1010, or any other components in system 1000, or combinations thereof. The connection with the network 1026 may be a physical connection, such as a wired Ethernet connection or may be established wirelessly as discussed later. Likewise, the additional connections with other components of the system 1000 may be physical connections or may be established wirelessly. The network 1026 may alternatively be directly connected to the bus 1008.

The network 1026 may include wired networks, wireless networks, Ethernet AVB networks, or combinations thereof. The wireless network may be a cellular telephone network, an 802.11, 802.16, 802.20, 802.1Q or WiMax network. Further, the network 1026 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

In an example, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative example, dedicated hardware implementations, such as application specific integrated circuits, programmable logic arrays and other hardware devices, can be constructed to implement various modules or parts of modules included in the system. Applications that may include the apparatus and systems can broadly include a variety of electronic and computer systems. One or more examples described may implement functions using two or more specific interconnected hardware modules or devices with related control and data signals that can be communicated between and through the modules, or as portions of an application-specific integrated circuit. Accordingly, the present system encompasses software, firmware, and hardware implementations.

The system described may be implemented by software programs executable by a computer system. Further, in a non-limited example, implementations can include distributed processing, component/object distributed processing, and parallel processing. Alternatively, virtual computer system processing, such as cloud computing, can be constructed to implement various parts of the system.

The system is not limited to operation with any particular standards and protocols. For example, standards for Internet and other packet switched network transmission (e.g., TCP/IP, UDP/IP, HTML, HTTP) may be used. Such standards are periodically superseded by faster or more efficient equivalents having essentially the same functions. Accordingly, replacement standards and protocols having the same or similar functions as those disclosed are considered equivalents thereof.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A listener device configured to establish a connection with a talker device over an Ethernet Audio-Video Bridging ("AVB") network, the listener device comprising:
   a plurality of modules executable by a processor, the plurality of modules comprising:
      a Stream Reservation Protocol ("SRP") stack module to establish connections over the Ethernet AVB network in accordance with SRP;
      a state machine module in communication with the SRP stack module;
      a non-AVB application layer interface module in communication with the state machine module, the non-AVB application layer interface module configured to communicate with the SRP stack module via the state machine module,
      where the non-AVB application layer interface module is configured to:
         determine that the listener device is to connect to a data stream transmitted over the Ethernet AVB network from the talker device;
         in response to the determination, communicate a non-AVB message to the state machine module, the non-AVB message indicating to the state machine module to connect to the data stream; and
      where the state machine module is configured to:
         receive the non-AVB message;
         in response to receipt of the non-AVB message, determine, using the SRP stack module, that the talker device wants to transmit the data stream; and
         connect to the data stream transmitted over the Ethernet AVB network according to SRP in response to the determination that the talker device wants to transmit the data stream.

2. The listener device of claim 1, where the non-AVB application layer interface module comprises a function block ("FBlock") interface.

3. The listener device of claim 1, where the non-AVB message comprises a first non-AVB message, and where the non-AVB application layer interface module is further configured to:
   receive a second non-AVB message from a controller connected to the Ethernet AVB network, the second non-AVB message instructing the listener device to connect to the data stream, and
   determine that the listener device is to connect to the data stream in response to receipt of the second non-AVB message.

4. The listener device of claim 3, where the non-AVB application layer interface module is further configured to send a success message to the controller, the success message indicating that the listener device successfully connected to the data stream.

5. The listener device of claim 3, where the state machine module is further configured to:
   determine that the listener device is unable to connect to the data stream; and
   send a failure message to the controller, the failure message indicating that the listener device is unable to connect to the data stream.

6. The listener device of claim 1, where the state machine module is further configured to communicate a query to the SRP stack module, the query identifying the data stream to which the listener device is to connect, and
   where the state machine module is configured to determine, using the SRP stack module, that the talker device wants to transmit the data stream in response to communication of the query to the SRP stack module.

7. The listener device of claim 6, where the state machine module is further configured to announce over the Ethernet AVB network to the talker device, using the SRP stack module, that the listener device is able to connect to the data stream in response to receipt of the non-AVB message indicating that the listener device is to connect to the data stream.

8. The listener device of claim 7, where the state machine module is configured to register, using the SRP stack module, a listener ready event in accordance with SRP to announce over the Ethernet AVB network that the listener device is able to connect to the data stream.

9. The listener device of claim 1, where the state machine module is further configured to start an audio/video transport protocol ("AVTP") engine to receive the data stream in response to receipt of the non-AVB message indicating that the listener device is to connect to the data stream.

10. The listener device of claim 9, where the state machine module is further configured to stop the AVTP engine to stop receipt of the data stream in response to one of:
    receipt of a talker deregister event in accordance with SRP; or
    receipt of a disconnect message received from a controller via the non-AVB application layer interface module.

11. A method of a listener device establishing a connection with a talker device over an Ethernet Audio-Video Bridging ("AVB") network, the method comprising:
    providing in the listener device a plurality of modules executable by a processor, the plurality of modules comprising a stream reservation protocol ("SRP") stack module to establish connections over the Ethernet AVB network in accordance with SRP; a state machine module in communication with the SRP stack module, and a non-AVB application layer interface module that communicates with the SRP stack module via the state machine module;

sending, with the non-AVB application layer interface module, a success message to the controller, the success message indicating that the listener device successfully connected to the data stream.

12. The method of claim 11, where the non-AVB application layer interface module comprises a function block ("FBlock") interface.

13. The method of claim 11, where receiving the instruction for the listener device to connect to the data stream comprises receiving, with the non-AVB application layer interface module, the instruction from a controller connected to the Ethernet AVB network.

14. The method of claim 13, further comprising:
receiving, with the non-AVB application layer interface module, an instruction for the listener device to connect to a data stream transmitted over the Ethernet AVB network from the talker device;
communicating a non-AVB message to the state machine module indicating to the state machine module to connect to the data stream, the non-AVB message communicated by the non-AVB application layer interface module;
in response to receiving the non-AVB message, determining, with the state machine module using the SRP stack module, that the talker device wants to transmit the data stream;
with the state machine module using the SRP module, connecting to the data stream transmitted over the Ethernet AVB network according to SRP in response to the determination that the talker device wants to transmit the data stream.

15. The method of claim 13, further comprising:
determining, with the state machine module, that the listener device is unable to connect to the data stream; and
sending, with the state machine module, a failure message to the controller, the failure message indicating that the listener device is unable to connect to the data stream.

16. The method of claim 11, further comprising:
communicating, with the state machine module, a query to the SRP stack module, the query identifying the data stream to which the listener device is to connect,
where determining that the talker device wants to transmit the data stream comprises determining, with the state machine module using the SRP stack module, that the talker device wants to transmit the data stream in response to communication of the query to the SRP stack module.

17. The method of claim 16, further comprising:
with the state machine module using the SRP stack module, announcing over the Ethernet AVB network to the talker device that the listener device is able to connect to the data stream in response to receiving the non-AVB message indicating to the state machine module to connect to the data stream.

18. The method of claim 17, where announcing that the listener device is able to connect to the data stream comprises:
with the state machine module using the SRP stack module, registering a listener ready event in accordance with SRP.

19. The method of claim 11, further comprising:
starting, with the state machine module, an audio/video transport protocol ("AVTP") engine to receive the data stream in response to receiving the non-AVB message indicating to the state machine module to connect to the data stream.

20. The method of claim 19, further comprising:
stopping, with the state machine module, the AVTP engine to stop receiving the data stream in response to one of:
receiving, with the state machine module being executed by the processor using the SRP stack module, a talker deregister event in accordance with SRP; or
receiving, with the state machine module being executed by the processor, a disconnect message received from a controller via the non-AVB application layer interface module.

* * * * *

UNITED STATES PATENT AND TRADEMARK OFFICE
CERTIFICATE OF CORRECTION

PATENT NO. : 8,977,759 B2
APPLICATION NO. : 13/987652
DATED : March 10, 2015
INVENTOR(S) : David Olsen, Levi Pearson and Craig Gunther It is certified that error appears in the above-identified patent and that said Letters Patent is hereby corrected as shown below:

In the Claims

In Claim 11:
In Column 37 from lines 7 to 10, replace the phrases:
"sending, with the non-AVB application layer interface module, a success message to the controller, the success message indicating that the listener device successfully connected to the data stream."

with:
"receiving, with the non-AVB application layer interface module, an instruction for the listener device to connect to a data stream transmitted over the Ethernet AVB network from the talker device;

communicating a non-AVB message to the state machine module indicating to the state machine module to connect to the data stream, the non-AVB message communicated by the non-AVB application layer interface module;

in response to receiving the non-AVB message, determining, with the state machine module using the SRP stack module, that the talker device wants to transmit the data stream;

with the state machine module using the SRP module, connecting to the data stream transmitted over the Ethernet AVB network according to SRP in response to the determination that the talker device wants to transmit the data stream."

In Claim 14:
In Column 37 from lines 21 to 38, replace the phrases:
"receiving, with the non-AVB application layer interface module, an instruction for the listener device to connect to a data stream transmitted over the Ethernet AVB network from the talker device;

communicating a non-AVB message to the state machine module indicating to the state machine module to connect to the data stream, the non-AVB message communicated by the non-AVB Signed and Sealed this
Twenty-third Day of June, 2015

Michelle K. Lee
*Director of the United States Patent and Trademark Office*

CERTIFICATE OF CORRECTION (continued)
U.S. Pat. No. 8,977,759 B2 application layer interface module;

in response to receiving the non-AVB message, determining, with the state machine module using the SRP stack module, that the talker device wants to transmit the data stream;

with the state machine module using the SRP module, connecting to the data stream transmitted over the Ethernet AVB network according to SRP in response to the determination that the talker device wants to transmit the data stream."

with:
"sending, with the non-AVB application layer interface module, a success message to the controller, the success message indicating that the listener device successfully connected to the data stream."